(12) United States Patent
Kaneda et al.

(10) Patent No.: US 11,735,726 B2
(45) Date of Patent: Aug. 22, 2023

(54) POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

(71) Applicant: SUMITOMO METAL MINING CO., LTD., Tokyo (JP)

(72) Inventors: Haruki Kaneda, Niihama (JP); Yuki Koshika, Niihama (JP); Takuma Nakamura, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 950 days.

(21) Appl. No.: 16/473,045

(22) PCT Filed: Dec. 25, 2017

(86) PCT No.: PCT/JP2017/046391
§ 371 (c)(1),
(2) Date: Mar. 24, 2020

(87) PCT Pub. No.: WO2018/123951
PCT Pub. Date: Jul. 5, 2018

(65) Prior Publication Data
US 2020/0388841 A1 Dec. 10, 2020

(51) Int. Cl.
*H01M 4/505* (2010.01)
*H01M 4/525* (2010.01)
(Continued)

(52) U.S. Cl.
CPC ......... *H01M 4/505* (2013.01); *H01M 4/0471* (2013.01); *H01M 4/525* (2013.01);
(Continued)

(58) Field of Classification Search
CPC ....... H01M 10/0525; H01M 2004/028; H01M 2220/20; H01M 4/0471; H01M 4/505; H01M 4/525
See application file for complete search history.

(56) References Cited

U.S. PATENT DOCUMENTS

| 2011/0052990 A1 | 3/2011 | Yanagida et al. |
| 2011/0195309 A1 | 8/2011 | Nina et al. |

(Continued)

FOREIGN PATENT DOCUMENTS

| JP | 2002-151071 A | 5/2002 |
| JP | 2003-068298 A | 3/2003 |

(Continued)

OTHER PUBLICATIONS

International Search Report dated Apr. 3, 2018, issued in counterpart PCT/JP2017/046391, with English Translation (5 pages).

(Continued)

*Primary Examiner* — Carlos Barcena
(74) *Attorney, Agent, or Firm* — WHDA, LLP

(57) ABSTRACT

A positive electrode active material for a nonaqueous electrolyte secondary battery is disclosed which contains a lithium-nickel-manganese composite oxide containing a secondary particle formed of a plurality of flocculated primary particles and a lithium-niobium compound. The positive electrode active material is represented by General Formula (1): $Li_d Ni_{1-a-b-c} Mn_a M_b Nb_c O_{2+\gamma}$ (M is at least one element selected from Co, W, Mo, V, Mg, Ca, Al, Ti, Cr, Zr, and Ta; and $0.03 \leq a \leq 0.60$, $0 \leq b \leq 0.60$, $0.02 \leq c \leq 0.08$, $a+b+c<1$, $0.95 \leq d \leq 1.20$, and $0 \leq \gamma \leq 0.5$, the lithium-nickel-manganese composite oxide has a (003)-plane crystallite diameter of at least 50 nm and up to 130 nm, the lithium-niobium compound is present on surfaces of the primary particles, and (Continued)

part of niobium in the positive electrode active material is solid-solved in the primary particles.

16 Claims, 11 Drawing Sheets

(51) Int. Cl.
    *H01M 4/04*             (2006.01)
    *H01M 10/0525*       (2010.01)
    *H01M 4/02*             (2006.01)

(52) U.S. Cl.
    CPC .. *H01M 10/0525* (2013.01); *H01M 2004/028* (2013.01); *H01M 2220/20* (2013.01)

(56) References Cited

U.S. PATENT DOCUMENTS

| | | |
|---|---|---|
| 2013/0277604 A1 | 10/2013 | Shimokita et al. |
| 2014/0011090 A1 | 1/2014 | Toya et al. |
| 2015/0194673 A1 | 7/2015 | Takagi et al. |
| 2016/0293952 A1 | 10/2016 | Kaneda et al. |
| 2017/0012288 A1 | 1/2017 | Yamaji et al. |
| 2017/0317339 A1 | 11/2017 | Shimokita et al. |
| 2018/0347069 A1 | 12/2018 | Toya et al. |

FOREIGN PATENT DOCUMENTS

| | | |
|---|---|---|
| JP | 2005-251716 A | 9/2005 |
| JP | 2011-108554 A | 6/2011 |
| JP | 2013-239434 A | 11/2013 |
| JP | 2015-072801 A | 4/2015 |
| JP | 2015-122298 A | 7/2015 |
| WO | 2012/121220 A1 | 9/2012 |
| WO | 2012/131881 A1 | 10/2012 |
| WO | 2014/034430 A1 | 3/2014 |
| WO | 2015/076323 A1 | 5/2015 |
| WO | 2015/115547 A1 | 8/2015 |

OTHER PUBLICATIONS

International Preliminary Report on Patentability (Form PCT/IB/373) issued in counterpart International Application No. PCT/JP2017/046391 dated Jul. 2, 2019, with Form PCT/ISA/237, with English Translation. (13 pages).

Extended (Supplementary) European Search Report dated Aug. 5, 2020, issued in counterpart EP Application No. 17887069.7. (5 pages).

Office Action dated Oct. 12, 2022, issued in counterpart KR Application No. 10-2019-7017902, with English translation. (18 pages).

POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

TECHNICAL FIELD

The present invention relates to a positive electrode active material for a nonaqueous electrolyte secondary battery, a method for producing the same, and a nonaqueous electrolyte secondary battery.

BACKGROUND ART

In recent years, with the proliferation of portable electronic equipment such as cellular phones and notebook personal computers, development of a secondary battery with reduced size and weight having high battery capacity and durability is intensely demanded. Development of a high output secondary battery is intensely demanded as a battery for power tools and electric vehicles including hybrid cars.

Nonaqueous electrolyte secondary batteries such as lithium-ion secondary batteries are secondary batteries satisfying such a demand. A nonaqueous electrolyte secondary battery includes a negative electrode, a positive electrode, and a nonaqueous electrolyte; for active materials of the negative electrode and the positive electrode, materials that can de-insert and insert lithium are being used. In addition to high battery capacity, durability, and the like, higher thermal stability is required for nonaqueous electrolyte secondary batteries.

Among nonaqueous electrolyte secondary batteries, the research and development of which are currently energetically being conducted, nonaqueous electrolyte secondary batteries containing a layered or spinel type lithium-metal composite oxide as a positive electrode active material can obtain as high voltage as 4 V class and are thus being practically used as batteries having high energy density.

For the lithium-metal composite oxide used for the positive electrode active material, currently developed are a lithium-cobalt composite oxide ($LiCoO_2$), which is relatively easily synthesized; a lithium-nickel composite oxide ($LiNiO_2$) containing nickel, which is lower in price than cobalt; and a lithium-manganese composite oxide ($LiMn_2O_4$) and a lithium-nickel-manganese composite oxide ($LiNi_{0.5}Mn_{0.5}O_2$) containing manganese.

In recent years, the lithium-nickel-cobalt-manganese composite oxide ($LiNi_{1/3}Co_{1/3}Mn_{1/3}O_2$), which is excellent in thermal stability and high in capacity, has received attention. The lithium-nickel-cobalt-manganese composite oxide is a layered compound like the lithium-cobalt composite oxide and the lithium-nickel composite oxide and contains nickel, cobalt, and manganese in transition metal sites basically with a composition ratio of 1:1:1.

Although the lithium-metal composite oxide has high energy density as described above, it contains a nonaqueous electrolyte as a battery material and thus requires higher thermal stability. It is known that the lithium-ion secondary battery, by being given heat at a charged state, releases oxygen from crystals, which reacts with an electrolyte solution to cause thermal runaway, for example.

As to methods that increase thermal stability at the time of overcharging, presented are a method that adds a heterogeneous element to the positive electrode active material to stabilize a crystal structure and a method that coats the surface of the positive electrode active material with an oxide such as $SiO_2$, $Al_2O_3$, or $ZrO_2$, for example. However, by these methods of production, initial battery capacity significantly reduces, and it is difficult to achieve both improvement in battery capacity and thermal stability. In addition, the methods of production are complicated in production processes or have difficulties in increasing scale, and thus production on an industrial scale is difficult in many cases.

For the purpose of obtaining a positive electrode having high performance (high capacity, thermal stability, and high output) as the nonaqueous electrolyte secondary battery, some techniques that add heterogeneous metals such as tungsten and niobium to the lithium-metal composite oxide are presented.

Patent Literature 1 presents a positive electrode active material for a nonaqueous electrolyte secondary battery containing a composition formed of one or more compounds containing lithium, nickel, cobalt, an element M, niobium, and oxygen indicated by a general formula: $Li_aNi_{1-x-y-z}Co_xM_yNb_zO_b$ (where M is one or more elements selected from the group consisting of Mn, Fe, and Al; 1≤a≤1.1, 0.1≤x≤0.3, 0≤y≤0.1, 0.01≤z≤0.05, and 2≤b≤2.2), for example. According to Patent Literature 1, it is said that a Li—Nb—O-based compound present near surfaces of particles or therewithin has high thermal stability, and thus a positive electrode active material having high thermal stability and large discharging capacity can be obtained.

Patent Literature 2 presents a positive electrode active material for a nonaqueous electrolyte secondary battery containing a lithium-transition metal composite oxide formed of particles with a polycrystalline structure obtained by a method of production including a mixing process of mixing a nickel-containing hydroxide, a lithium compound, and a niobium compound with an average particle diameter of 0.1 to 10 μm to obtain a lithium mixture and a firing process of firing the lithium mixture in an oxidizing atmosphere at 700 to 840° C. to obtain the lithium-transition metal composite oxide. It is stated that this positive electrode active material is a positive electrode active material having a porous structure, a specific surface area of 0.9 to 3.0 $m^2/g$, and a content of an alkaline metal other than lithium of up to 20 ppm by mass. According to Patent Literature 2, it is said that a positive electrode active material that achieves both high thermal stability and high charging/discharging capacity and is excellent in cycle characteristics can be obtained.

Patent Literature 3 presents a positive electrode active material for a nonaqueous electrolyte secondary battery containing a lithium-transition metal composite oxide formed of particles with a polycrystalline structure obtained by a method of production including a niobium coating process of simultaneously adding a niobium salt solution and an acid to slurry of a nickel-containing hydroxide, performing control such that the pH of the slurry is constant in a range of 7 to 11 with 25° C. as a basis to obtain a nickel-containing hydroxide coated with a niobium compound, a mixing process of mixing the nickel-containing hydroxide coated with a niobium compound with a lithium compound to obtain a lithium mixture, and a firing process of firing the lithium mixture in an oxidizing atmosphere at 700 to 830° C. to obtain the lithium-transition metal composite oxide. It is stated that this positive electrode active material has a porous structure and a specific surface area of 2.0 to 7.0 $m^2/g$. According to Patent Literature 3, it is said that using this positive electrode active material can obtain a nonaqueous electrolyte secondary battery having high safety and battery capacity and excellent cycle characteristics.

Patent Literature 4 presents a positive electrode active material for a nonaqueous electrolyte secondary battery having at least a lithium-transition metal composite oxide with a layered structure, in which the lithium-transition metal composite oxide is present in the form of particles formed of either one or both of primary particles and a secondary particle as a flocculated body thereof, in which the aspect ratio of the primary particle is 1 to 1.8, and has a compound having at least one selected from the group consisting of molybdenum, vanadium, tungsten, boron, and fluorine at least on surfaces of the particles, for example. According to Patent Literature 4, it is said that having the compound having at least one selected from the group consisting of molybdenum, vanadium, tungsten, boron, and fluorine on the surfaces of the particles improves conductivity.

Patent Literature 5 presents lithium-transition metal-based compound powder for a lithium secondary battery positive electrode material having a lithium-transition metal-based compound having a function of enabling insertion and de-insertion of lithium ions as a main component and formed by adding one compound containing at least one element selected from B and Bi and one compound containing at least one element selected from Mo, W, Nb, Ta, and Re in combination to the main component raw material and then firing the mixture. According to Patent Literature 5, it is said that adding the additional elements in combination and then firing the mixture can obtain lithium-transition metal-based compound powder formed of fine particles in which particle growth and sintering are inhibited and obtain lithium-transition metal-based compound powder with improved rate and output characteristics and easy to handle and prepare an electrode.

Patent Literature 6 presents a positive electrode composition for a nonaqueous electrolyte solution secondary battery containing a lithium-transition metal composite oxide represented by a general formula $Li_aNi_{1-x-y}Co_xM^1_yW_zM^2_wO_2$ (1.0≤a≤1.5, 0≤x≤0.5, 0≤y≤0.5, 0.002≤z≤0.03, 0≤w≤0.02, 0≤x+y≤0.7; $M^1$ is at least one selected from the group consisting of Mn and Al; and $M^2$ is at least one selected from the group consisting of Zr, Ti, Mg, Ta, Nb, and Mo) and a boron compound containing a boron element and an oxygen element. According to Patent Literature 6, it is said that using a positive electrode composition containing the lithium-transition metal composite oxide essentially containing nickel and tungsten and a specific boron compound can improve output characteristics and cycle characteristics in the positive electrode composition containing the lithium-transition metal composite oxide.

Also presented is a technique that uses a positive electrode formed of particles having a uniform, appropriate particle diameter and having a hollow structure to obtain high performance (high cycle characteristics, low resistance, and high output) as a battery. Patent Literature 7 presents a positive electrode active material for a nonaqueous electrolyte secondary battery formed of a lithium-nickel-manganese composite oxide represented by a general formula: $Li_{1+u}Ni_xMn_yCo_zM_tO_2$ (−0.05≤u≤0.50, x+y+z+t=1, 0.3≤x≤0.7, 0.1≤y≤0.55, 0≤z≤0.4, and 0≤t≤0.1; and M is an additional element and is one or more elements selected from Mg, Ca, Al, Ti, V, Cr, Zr, Nb, Mo, and W) and formed of a hexagonal lithium-containing composite oxide having a layered structure and including a hollow structure including a shell part formed of sintered flocculated primary particles having an average particle diameter of 2 to 8 μm and [(d90−d10)/the average particle diameter] as an indicator indicating a spread of particle size distribution of up to 0.60 and a hollow part present therewithin, for example. According to Patent Literature 7, it is said that this positive electrode active material is high in capacity and favorable in cycle characteristics and enables high output when used for nonaqueous electrolyte secondary batteries.

CITATION LIST

Patent Literature

[Patent Literature 1] Japanese Unexamined Patent Application Publication No. 2002-151071
[Patent Literature 2] Japanese Unexamined Patent Application Publication No. 2015-122298
[Patent Literature 3] International Publication No. 2014/034430
[Patent Literature 4] Japanese Unexamined Patent Application Publication No. 2005-251716
[Patent Literature 5] Japanese Unexamined Patent Application Publication No. 2011-108554
[Patent Literature 6] Japanese Unexamined Patent Application Publication No. 2013-239434
[Patent Literature 7] International Publication No. 2012/131881

SUMMARY OF INVENTION

Technical Problem

However, although the nonaqueous electrolyte secondary batteries presented in Patent Literature 1 to 7 all improve in battery capacity, output characteristics, thermal stability, and the like to some extent, further improvement in battery capacity, durability, and thermal stability is demanded.

The present invention has been made in view of these circumstances, and an object thereof is to provide a positive electrode active material that can obtain a nonaqueous electrolyte secondary battery that achieves both high battery capacity and durability, and thermal stability at the time of overcharging at a high level. Another object of the present invention is to provide a method that can produce such a positive electrode active material easily in production on an industrial scale.

Solution to Problem

The inventors of the present invention intensively studied to solve the above problems and have found out that a specific amount of niobium is added to a lithium-nickel-manganese composite oxide containing a specific amount of manganese, whereby both improvement in battery characteristics and high thermal stability caused by inhibition of oxygen release at the time of overcharging can be achieved to complete the present invention.

A first aspect of the present invention provides a positive electrode active material for a nonaqueous electrolyte secondary battery, the positive electrode active material containing a lithium-nickel-manganese composite oxide containing a secondary particle formed of a plurality of flocculated primary particles and a lithium-niobium compound, in which the positive electrode active material is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.03 \leq a \leq 0.60$, $0 \leq b \leq 0.60$, $0.02 \leq c \leq 0.08$, $a+b+c<1$, $0.95 \leq d \leq 1.20$, and $0 \leq \gamma \leq 0.5$), the lithium-nickel-manganese composite oxide has a (003)-plane crystallite diameter of at least 50 nm and up to 130 nm, the lithium-niobium compound is present on surfaces of the primary particles, and part of niobium in the positive electrode active material is solid-solved in the primary particles.

The lithium-niobium compound preferably contains any one of $Li_3NbO_4$, $LiNbO_3$, $Li_5NbO_5$, $LiNb_3O_8$, and $Li_8Nb_2O_9$. Furthermore, the lithium-niobium compound may contain an amorphous phase. The positive electrode active material preferably has a volume average particle diameter MV of at least 5 μm and up to 20 μm. The secondary particle preferably has an average degree of circularity E of at least 0.60 and up to 0.98, the degree being determined by Expression (1):

$$E = 4\pi S/L^2 \quad \text{Expression (1):}$$

(in the expression, S is a projected area of the secondary particle, L is a circumferential length of the secondary particle, and π is the ratio of the circumference of a circle to its diameter).

A second aspect of the present invention provides a method for producing a positive electrode active material for a nonaqueous electrolyte secondary battery, the positive electrode active material containing a lithium-nickel-manganese composite oxide containing a secondary particle formed of a plurality of flocculated primary particles and a lithium-niobium compound, the method including a niobium mixing process of preparing a lithium-niobium mixture containing nickel-manganese composite hydroxide particles represented by General Formula (2): $Ni_{1-a-b}Mn_aM_b(OH)_{2+\alpha}$ (in Formula (2), M is at least one element selected from Co, W, Mo, V, Mg, Ca, Al, Ti, Cr, Zr, and Ta; and $0.03 \leq a \leq 0.60$, $0 \leq b \leq 0.60$, and $0 \leq \alpha \leq 0.4$), a niobium compound, and a lithium compound and a firing process of firing the lithium-niobium mixture in an oxidizing atmosphere at at least 750° C. and up to 1,000° C. to obtain the lithium-nickel-manganese composite oxide and the lithium-niobium compound, in which the positive electrode active material is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.03 \leq a \leq 0.60$, $0 \leq b \leq 0.60$, $0.02 \leq c \leq 0.08$, $0.95 \leq d \leq 1.20$, and $0 \leq \gamma \leq 0.5$), the lithium-niobium compound is present on surfaces of the primary particles, and part of niobium in the positive electrode active material is solid-solved in the primary particles.

The niobium mixing process may include a crystallization process of obtaining the nickel-manganese composite hydroxide particles by crystallization and a first mixing process of mixing the nickel-manganese composite hydroxide particles, the lithium compound, and the niobium compound having an average particle diameter of at least 0.01 μm and up to 10 μm to prepare the lithium-niobium mixture. The niobium compound is preferably either one or both of niobic acid and niobium oxide.

The niobium mixing process may include a crystallization process of obtaining the nickel-manganese composite hydroxide particles by crystallization, a niobium coating process of mixing the nickel-manganese composite hydroxide particles and water together to form slurry, simultaneously adding a niobium salt solution and an acid to the slurry such that the pH of the slurry is constant in a range of at least 7 and up to 11 with a liquid temperature of 25° C. as a basis to coat the nickel-manganese composite hydroxide particles with a niobium compound to obtain niobium-coated composite hydroxide particles, and a second mixing process of mixing the niobium-coated composite hydroxide particles and the lithium compound together to prepare the lithium-niobium mixture. Before preparing the lithium-niobium mixture, a thermal treatment process of thermally treating the nickel-manganese composite hydroxide particles at a temperature of at least 105° C. and up to 700° C. may be included, and the niobium mixing process may prepare a lithium-niobium mixture containing either or both of nickel-manganese composite hydroxide particles and nickel-manganese composite oxide particles obtained by the thermal treatment, a niobium compound, and a lithium compound.

A third aspect of the present invention provides a nonaqueous electrolyte secondary battery including a positive electrode, a negative electrode, and a nonaqueous electrolyte, in which the positive electrode contains the positive electrode active material for a nonaqueous electrolyte secondary battery.

The positive electrode active material for a nonaqueous electrolyte secondary battery of the present invention used for a positive electrode can obtain a nonaqueous electrolyte secondary battery that achieves both high battery capacity and excellent durability and thermal stability at the time of overcharging at a high level. The method for producing a positive electrode active material for a nonaqueous electrolyte secondary battery of the present invention can be performed easily even in production on an industrial scale, and thus its industrial value is extremely high.

DESCRIPTION OF EMBODIMENTS

The following describes (1) a positive electrode active material for a nonaqueous electrolyte secondary battery, (2) a method for producing the same, and (3) a nonaqueous electrolyte secondary battery containing the positive electrode active material according to the present embodiment with reference to the accompanying drawings. The drawings represent with part thereof emphasized or part thereof simplified in order for the components to be easy-to-understand, and actual structures or shapes, a scale reduction, and the like may be different.

Figure 1A:
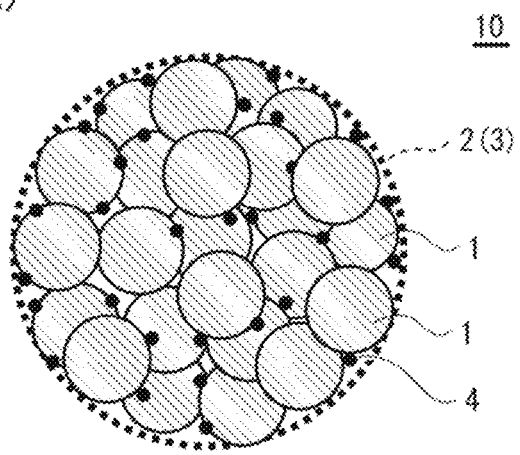
FIG. 1(A) to FIG. 1(C) are schematic diagrams of an exemplary positive electrode active material of the present embodiment.
Figure 1B:
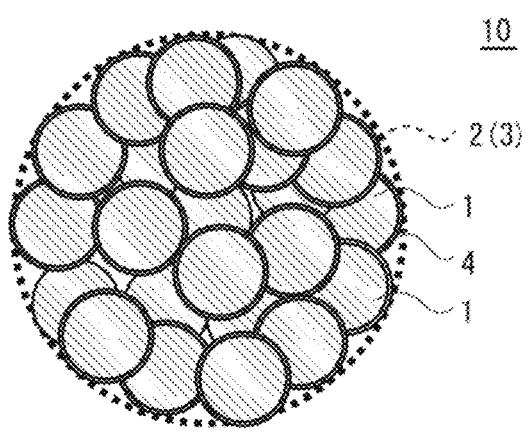
Figure 1C:
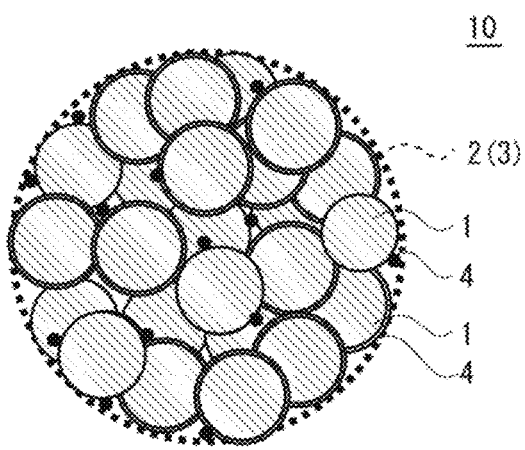

(1) Positive Electrode Active Material for Nonaqueous Electrolyte Secondary Battery FIG. 1(A) to FIG. 1(C) are schematic diagrams of an exemplary positive electrode active material for a nonaqueous electrolyte secondary battery according to the present embodiment (hereinafter, also referred to as a "positive electrode active material 10"). The positive electrode active material 10 contains particles with a polycrystalline structure. The positive electrode active material 10 contains a lithium-nickel-manganese composite oxide 3 containing a secondary particle 2 formed of a plurality of flocculated primary particles 1 (hereinafter, also referred to as a "lithium-metal composite oxide 3) and a lithium-niobium compound 4.

The entire composition of the positive electrode active material 10 is represented by General Formula (1): $Li_d Ni_{1-a-b-c}Mn_a M_b Nb_c O_{2+\gamma}$ (in General Formula (1), M is at least one element selected from Co, W, Mo, V, Mg, Ca, Al, Ti, Cr, Zr, and Ta; and $0.03 \le a \le 0.60$, $0 \le b \le 0.60$, $0.02 \le c \le 0.08$, $a+b+c<1$, $0.95 \le d \le 1.20$, and $0 \le \gamma \le 0.5$). That is to say, the positive electrode active material 10 contains niobium (Nb) in an amount of at least 2 atom % and up to 8 atom % relative to the entire metal elements other than Li. Part of niobium in the positive electrode active material 10 is solid-solved in the primary particles 1, and part thereof is present as a lithium-niobium compound 4 on surfaces of the primary particles 1. The lithium-niobium compound 4 refers to a compound containing at least lithium (Li) and niobium (Nb).

A nonaqueous electrolyte secondary battery (hereinafter, refers to a "secondary battery") containing the positive electrode active material 10 described above has high battery capacity and has extremely high durability. The secondary battery containing the positive electrode active material 10 is higher in the thermal stability of the positive electrode active material at the time of overcharging than a case in which a positive electrode active material containing no niobium is contained.

In General Formula (1), the range of a indicating the content of Mn is $0.03 \le a \le 0.60$, preferably $0.05 \le a \le 0.60$, more preferably $0.10 \le a \le 0.55$, more preferably $0.10 < a \le 0.50$, and even more preferably $0.12 \le a \le 0.45$. When the value of a is within the above range, a secondary battery to be obtained can have excellent durability and high battery capacity and besides can have high thermal stability. In view of higher battery capacity, the range of a is preferably $0.03 \le a \le 0.45$, more preferably $0.03 \le a \le 0.45$, more preferably $0.03 \le a \le 0.35$, more preferably $0.03 \le a \le 0.3$, and even more preferably $0.03 \le a \le 0.2$ and may be $0.05 \le a \le 0.45$, may be $0.05 \le a \le 0.35$, may be $0.05 \le a \le 0.3$, and may be $0.05 \le a \le 0.2$. The positive electrode active material contains Mn and Nb in the above specific proportions, whereby the secondary battery can achieve both durability and thermal stability. The positive electrode active material contains manganese and can thereby improve thermal stability and contains manganese and niobium in combination (solid-solves them) and can thereby reduce the conductivity of the positive electrode active material. On the other hand, when the value of a is less than 0.03, the effect of improving thermal stability cannot be obtained. When the value of a is greater than 0.60, battery capacity reduces.

In General Formula (1), the range of c indicating the content of Nb is $0.02 \le c \le 0.08$ and preferably $0.02 \le c \le 0.055$. When the range of c is within the above range, extremely favorable durability can be obtained, oxygen release is inhibited when contained in a positive electrode of the secondary battery, and high thermal stability can be obtained. On the other hand, when the value of c is less than 0.02, although niobium is solid-solved in the primary particles, the lithium-niobium compound 4 is hardly formed, and the effect of improving durability may be insufficient. When the value of c is greater than 0.08, the lithium-niobium compound 4 is formed in a large amount, and battery capacity significantly reduces. Furthermore, in view of obtaining higher durability and battery capacity, the range of c is more preferably $0.02 \le c \le 0.04$. When the range of c is $0.03<c$, thermal stability tends to be more excellent. The composition of the positive electrode active material 10 can be measured by quantitative analysis by inductively coupled plasma (ICP) emission spectrometry. The presence of the lithium-niobium compound 4 can be determined by X-ray diffraction (XRD), for example.

In General Formula (1), M indicating an additional element is at least one element selected from Co, W, Mo, V, Mg, Ca, Al, Ti, Cr, Zr, and Ta; when z is greater than 0, thermal stability, storage characteristics, and battery characteristic can be improved. M containing Co, for example, is more excellent in battery capacity and output characteristics. When M is Co, preferably $0.05 \le z \le 0.5$, more preferably $0.05 \le z \le 0.4$, and even more preferably $0.1 \le z \le 0.4$.

When the content of Co of z indicating the content of M is z', the range of z' is preferably $0.05 \le z' \le 0.5$, more preferably $0.05 \le z' \le 0.4$, and even more preferably $0.1 \le z' \le 0.4$. In view of higher battery capacity, the range of z' is preferably $0.05 \le z' \le 0.45$, more preferably $0.05 \le z' \le 0.35$, more preferably $0.05 \le z' \le 0.3$, and even more preferably $0.05 \le z' \le 0.2$.

In General Formula (1), the content of nickel is indicated by $(1-a-b-c)$. The range of $(1-a-b-c)$ is preferably $0<(1-a-b-c)\le 0.95$ and more preferably $0.3\le(1-a-b-c)\le 0.95$. In the general formula, the value of $(1-a-b-c)$ indicating the content of Ni is determined by the values of a, b, and c indicating the contents of Mn, Nb, and M when the total of the metal elements other than Li is 1.

In General Formula (1), d indicating the content of Li satisfies $0.95 \le d \le 1.20$ and may satisfy $1<d \le 1.20$. In General Formula (1), γ indicating an excessive amount of O (oxygen) satisfies $0 \le \gamma \le 0.5$ and may satisfy $\gamma=0$.

In the positive electrode active material 10, part of niobium is solid-solved in the primary particles 1, and part of niobium is present as the lithium-niobium compound 4 on the surfaces of the primary particles 1. In the secondary battery containing the positive electrode active material 10, the reason for the improvement in battery characteristics and thermal stability is not limited to a particular reason; it is considered that the solid-solving of niobium into the primary particles 1 mainly provides the effect of improving thermal stability, whereas the lithium-niobium compound 4 present on the surfaces of the primary particles 1 mainly provides the effect of improving durability. The solid-solving of niobium into the primary particles 1 refers to a state in which niobium is detected in the positive electrode active material 10 by inductively coupled plasma (ICP) emission spectrometry, and niobium is detected at least within partial primary particles 1 by surface analysis on sections of the primary particles 1 using energy dispersive X-ray spectrometer (EDX) in a scanning transmission electron microscope (S-TEM), for example, (refer to FIG. 6(A) and FIG. 6(B)). Niobium solid-solved within the primary particles 1 is preferably detected across the whole of the primary particles 1.

Niobium solid-solved in the primary particles 1 has a maximum niobium concentration within the primary particles 1 of preferably at least one time and up to 3.5 times and preferably at least one time and up to three times an average niobium concentration within the primary particles 1. When the maximum niobium concentration within the primary particles 1 is greater than the above range, variations in a niobium concentration within the primary particles 1 are large, and there are some parts in which the niobium concentration is locally high, whereas there are some parts in which it is locally low. Consequently, parts in which the reaction resistance is high occur in the parts in which the niobium concentration is locally high, whereas the effect of thermal stability owing to the solid-solving of niobium cannot necessarily sufficiently be obtained in the parts in which the niobium concentration is locally low. In view of achieving both battery characteristics and thermal stability, the maximum niobium concentration is preferably up to two times the average niobium concentration within the primary particles 1. As described below, the maximum niobium concentration refers to an average of the maximum niobium concentrations of 20 or more primary particles 1 arbitrarily selected.

To obtain a higher effect, the presence of a part in which the niobium concentration is extremely low is preferably reduced within the primary particles 1; the minimum niobium concentration within the primary particles 1 is preferably at least 50% relative to the average niobium concentration within the primary particles 1. The minimum niobium concentration refers to an average of the minimum niobium concentrations of 20 or more primary particles 1 arbitrarily selected.

Variations in the niobium concentration within the primary particles 1 can be determined by performing line analysis of the composition of sections of the primary particles 1 by EDX measurement of an S-TEM. The ratio of the maximum niobium concentration to the average niobium concentration within the primary particles 1 (the maximum niobium concentration/the average niobium concentration) can be obtained by arbitrarily selecting at least 20 primary particles 1 from a plurality of secondary particles 2 and performing line analysis of the composition within sections of individual primary particles 1 by EDX of S-TEM, for example. Although the direction of the line analysis is preferably performed in a direction giving a maximum length of the sections of the primary particle 1, the line analysis may be performed in a direction in which analysis for a length of at least 50% of the maximum length is enabled in a case in which the influence of a niobium compound is excluded, for example. From measured values of the niobium concentration of the individual primary particles 1 obtained by the line analysis, the maximum niobium concentration and the average niobium concentration are determined, and the ratios of the maximum niobium concentration (the maximum niobium concentration/the average niobium concentration) of the individual primary particles 1 are each calculated. The values of the ratios of the maximum niobium concentration calculated from the individual primary particles 1 are number-averaged, whereby the ratio of the maximum niobium concentration within the primary particles 1 can be determined. Variations in the niobium concentration are values within the primary particles 1, and when a lithium-niobium compound 4 on the surfaces of the primary particles 1 is recognized by beforehand surface analysis or the like, the line analysis by EDX is performed at a position at which the measured value of the niobium concentration near the surfaces of the primary particles 1 is not influenced by the presence of the lithium-niobium compound 4 to measure variations in the niobium concentration.

As described above, it is considered that part of niobium (Nb) is solid-solved within the primary particles 1, whereby the secondary battery obtained using the positive electrode active material 10 strengthens bonding with oxygen and can improve thermal stability. Furthermore, Nb solid-solved within the primary particles 1 has an effect of inhibiting structural phase transition accompanying overcharging, and it is considered that this effect also contributes to improvement in thermal stability.

In the positive electrode active material 10, the lithium-niobium compound 4 is present on the surfaces of the primary particles 1. The distribution of the lithium-niobium compound 4 is only required to be present at least on part of the surfaces of the primary particles 1: as illustrated in FIG. 1(A), for example, it may be present as particles on the surfaces of the primary particles 1; or as illustrated in FIG. 1(B), for example, it may coat the entire surfaces of the primary particles. In addition, as illustrated in FIG. 1(C), the lithium-niobium compound 4 in particle form and the lithium-niobium compound 4 coating the entire primary particles may coexist. Furthermore, part of the lithium-niobium compound 4 may be present singly separately from the lithium-metal composite oxide 3. The lithium-niobium compound 4, when it is present at least on part of the surfaces of the primary particles, can increase the durability of the secondary battery to be obtained.

Figure 6A:
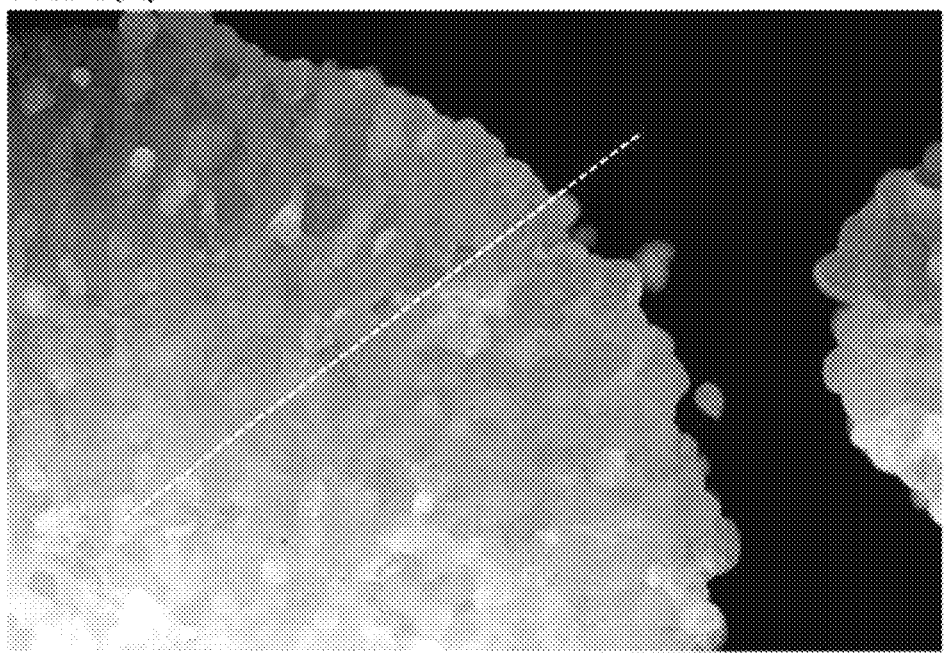
FIG. 6(A) and FIG. 6(B) are diagrams of evaluation results of a scanning transmission electron microscope (S-TEM) and energy dispersive X-ray spectrometer (EDX) of a positive electrode active material of Example 1.
Figure 6B:
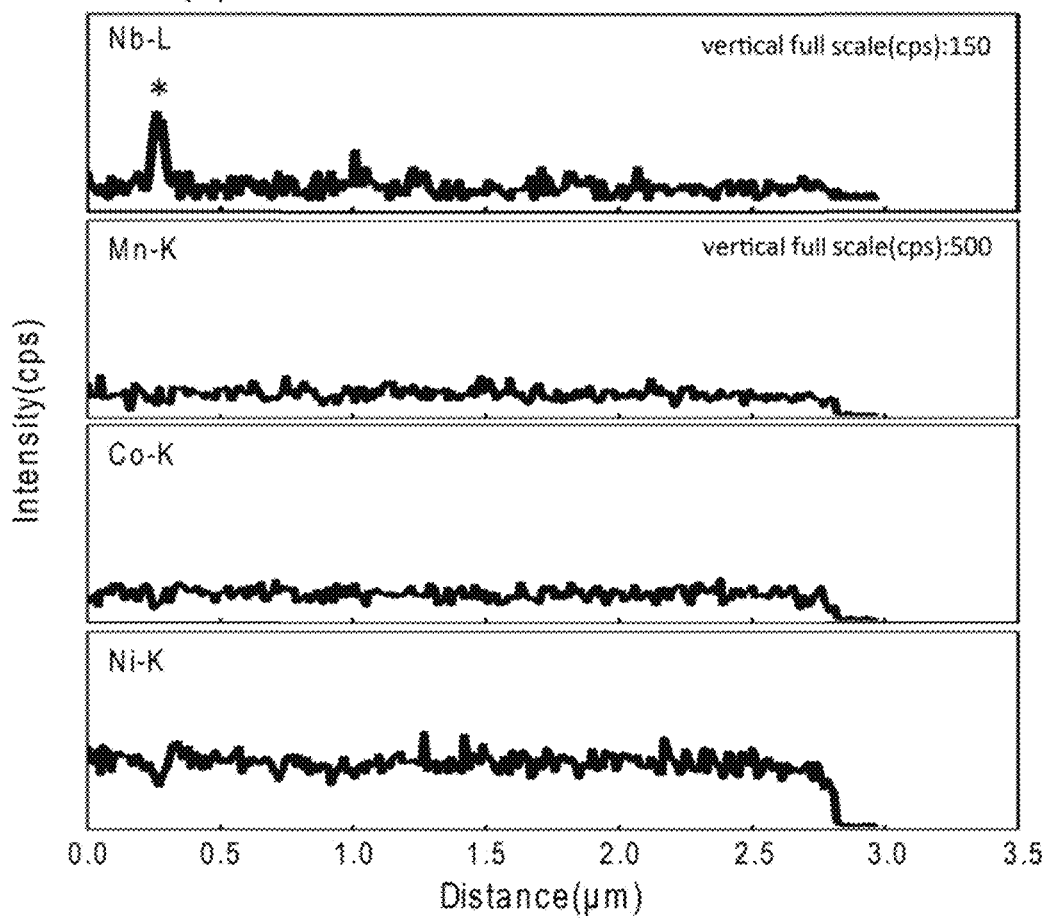

The presence of the lithium-niobium compound 4 on the surfaces of the primary particles 1 can be determined, as illustrated in FIG. 6(A) and FIG. 6(B), by detecting a part in which the niobium concentration is high on the surfaces (including grain boundaries) of the primary particles 1 (e.g., the * part in FIG. 6(B)) by combining a result of surface analysis or line analysis of a section of the lithium-metal composite oxide 3 using EDX of a scanning transmission electron microscope (S-TEM) and identifying the composition of a niobium compound present within the positive electrode active material 10 by X-ray diffraction. When the lithium-niobium compound 4 is present on the surfaces of the primary particles 1, for example, the niobium concentration in grain boundaries and the surfaces of the primary particles 1 normally exceeds three times the niobium concentration (average) within the primary particles 1.

It is considered that the lithium-niobium compound 4 is high in lithium ion conductivity and has an effect of facilitating movement of lithium ions, and the lithium-niobium compound 4 formed on the surfaces of the primary particles 1 can form Li conductive paths at the interface between an electrolyte solution and the primary particles. In addition, the lithium-niobium compound 4 has chemically extremely high stability. Consequently, it is considered that direct contact between the surface of the positive electrode active material 10, which increases in activity at the time of charging/discharging, and the electrolyte solution can be inhibited while smoothly passing lithium ions, deterioration of the positive electrode active material 10 is inhibited, and consequently extremely high durability can be obtained.

The lithium-niobium compound 4 preferably contains at least one selected from $Li_3NbO_4$, $LiNbO_3$, $Li_5NbO_5$, $LiNb_3O_8$, and $Li_8Nb_2O_9$, more preferably contains $Li_3NbO_4$ and $LiNbO_3$, which are high in the effect of improving durability, and is even more preferably formed of $Li_3NbO_4$. The lithium-niobium compound 4 may contain an amorphous phase at least in part thereof. The amorphous phase is excellent in lithium ion conductivity and may thus improve battery characteristics.

The surfaces of the primary particles 1 on which the lithium-niobium compound 4 is present are preferably surfaces of the primary particles 1 capable of being in contact with the electrolyte solution. The surfaces of the primary particles 1 capable of being in contact with the electrolyte solution not only include surfaces of the primary particles 1 exposed to the outer surface of the secondary particle but also include surfaces of the primary particles 1 near the surface of the secondary particle communicating with the outside of the secondary particle enabling the electrolyte solution to penetrate thereinto and surfaces of the primary particles 1 exposed to voids within the secondary particle. Furthermore, the surfaces of the primary particles 1 capable of being in contact with the electrolyte solution include grain boundaries between the primary particles 1 if bonding between the primary particles 1 is imperfect to enable the electrolyte solution to penetrate thereinto.

The lithium-niobium compound 4 formed on the surfaces of the primary particles 1 capable of being in contact with the electrolyte solution described above can facilitate movement of lithium ions in the positive electrode of the secondary battery. Consequently, the lithium-niobium compound 4 is formed on the surfaces of the primary particles 1 capable of being in contact with the electrolyte solution, whereby direct contact between the positive electrode active material 10 and the electrolyte solution can be inhibited while reducing an increase in the reaction resistance of the lithium-metal composite oxide 3, and higher durability can be obtained. The lithium-niobium compound 4 can be formed by increasing the content of niobium within the range of General Formula (1) or increasing a synthesizing (firing) temperature. When the niobium content is increased within the range of General Formula (1), as described below, the crystallite diameter of the lithium-metal composite oxide 3 to be obtained is reduced, and in addition the lithium-niobium compound 4 is formed on the surfaces of the primary particles 1, whereby high durability can be obtained.

When the lithium-niobium compound 4 is formed in an extremely small amount, it may be difficult to determine its presence form. However, even in this case, excessive lithium present on the surfaces of the primary particles 1 is considered to be an element forming a compound with niobium, and as described below, it is estimated that a niobium compound used in a production process and the excessive lithium react with each other to form the lithium-niobium compound 4. The lithium-niobium compound 4 may be present in a crystalline/amorphous mixed form or in an amorphous form. When the lithium-niobium compound 4 is present in a crystalline form, as the amount thereof increases, its presence can be determined by X-ray diffraction measurement.

In either of the presence forms, the lithium-niobium compound 4 is surmised to facilitate movement of lithium (Li) between the lithium-nickel-manganese composite oxide 3 and the electrolyte solution, and the lithium-niobium compound 4 is present at least on part of the surfaces of the primary particles 1, whereby deterioration of the positive electrode active material 10 is inhibited, and high durability can be obtained.

The crystallite diameter of the lithium-metal composite oxide 3 is at least 50 nm and up to 130 nm and preferably at least 70 nm and up to 130 nm. When the crystallite diameter is within the above range, high durability can be obtained without reducing battery capacity. When the crystallite diameter is less than 50 nm, extremely many grain boundaries are produced, which increases the resistance of the active material, and sufficient charging/discharging capacity cannot necessarily be obtained. On the other hand, when the crystallite diameter is greater than 130 nm, crystal growth excessively proceeds, which causes cation mixing, in which nickel is mixed into a lithium layer of the lithium-metal composite oxide 3 as a layered compound, and charging/discharging capacity may decrease. When the crystallite diameter is extremely large, the specific surface area reduces, leading to an increase in reaction resistance, and besides, durability may reduce. The crystallite diameter can be within the above range by adjusting a crystallization condition, a niobium addition amount, a firing temperature, a firing time, and the like. The crystallite diameter is determined from a peak of the (003) plane in X-ray diffraction (XRD) using the Scherrer equation.

The positive electrode active material 10 has an average particle diameter of preferably at least 5 μm and up to 20 μm and more preferably at least 4 μm and up to 15 μm. When the average particle diameter is within the above range, when the positive electrode active material is used for the positive electrode of the secondary battery, both high output characteristics and battery capacity, and high fillability to the positive electrode can be achieved. When the average particle diameter of the positive electrode active material is less than 5 μm, high fillability to the positive electrode cannot necessarily be obtained; when the average particle diameter is greater than 20 μm, high output characteristics and battery capacity cannot necessarily be obtained. The average particle diameter refers to a volume average particle diameter MV and can be determined from a volume integral value measured with a laser diffraction/scattering particle size distribution meter, for example.

The secondary particle 2 forming the lithium-metal composite oxide 3 has an average degree of circularity as an indicator of sphericity of preferably at least 0.60 and up to 0.98 and more preferably at least 0.70 and up to 0.98. When the average degree of circularity is within the above range, the fillability of the secondary particle 2 increases and can impart high energy density (volume energy density) when used for the positive electrode of the battery. Furthermore, the specific surface area increases, and thus the efficiency of contact with the electrolyte solution increases, and output characteristics can be increased. The average degree of circularity tends to be a larger value (that is to say, the secondary particle 2 can be formed to be more spherical) by increasing the content of niobium. The average degree of circularity can be calculated by arbitrarily selecting at least 30 secondary particles 2, determining a degree of circularity E of each of the secondary particles 2 by the following Expression (1), and using its average, for example. A projected area S and a circumferential length L of each of the secondary particles 2 can be determined by image analysis software (e.g., ImageJ) for the secondary particle 2 with a particle diameter of at least 1 μm observed with a scanning electron microscope (SEM) with a magnification of 1,000-fold.

$$E = 4\pi S/L^2 \qquad \text{Expression (1):}$$

(in the Expression (1), S is a projected area of the secondary particle, L is a circumferential length of the secondary particle, and π is the ratio of the circumference of a circle to its diameter.)

(2) Method for Producing Positive Electrode Active Material for Nonaqueous Electrode Secondary Battery FIGS. 2 to 5 are diagrams of exemplary methods for producing a positive electrode active material for a non-aqueous electrolyte secondary battery (hereinafter, also referred to as a "positive electrode active material") of the present embodiment. The method of production of the present embodiment can obtain the positive electrode active material containing the lithium-metal composite oxide 3 containing the secondary particle 2 formed of a plurality of flocculated primary particles 1, in which at least part of niobium is solid-solved in the primary particles 1, and the lithium-niobium compound 4 present on the surfaces of the primary particles 1 described above easily on an industrial scale.

The positive electrode active material to be obtained is represented by General Formula (1): $Li_dNi_{1-a-b-c}M_{n_a}M_bNb_cO_{2+\gamma}$ (in Formula (1), M is at least one element selected from Co, W, Mo, V, Mg, Ca, Al, Ti, Cr, Zr, and Ta; and $0.03 \leq a \leq 0.60$, $0 \leq b \leq 0.60$, $0.02 \leq c \leq 0.08$, $0.95 \leq d \leq 1.20$, and $0 \leq \gamma \leq 0.5$).

Figure 2:
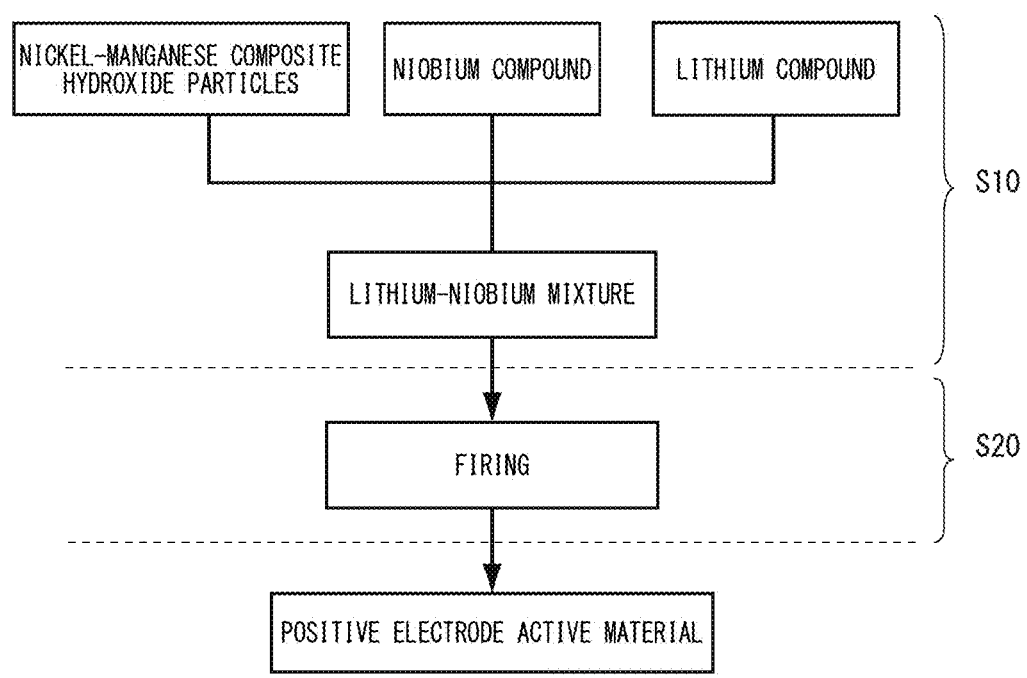
FIG. 2 is a diagram of an exemplary method for producing the positive electrode active material of the present embodiment.

As illustrated in FIG. 2, the method of production of the present embodiment includes a niobium mixing process (Step S10) of preparing a lithium-niobium mixture containing nickel-manganese composite hydroxide particles having a specific composition, a niobium compound, and a lithium compound and a firing process (Step S20) of firing the lithium-niobium mixture in an oxidizing atmosphere at at least 750° C. and up to 1,000° C. to obtain the lithium-nickel-manganese composite oxide. The following describes the method for producing a positive electrode active material of the present embodiment with reference to FIGS. 2 to 5. The following description is an exemplary method of production and is not a limited method of production.

[Niobium Mixing Process]

First, prepared is the lithium-niobium mixture containing the nickel-manganese composite hydroxide particles (hereinafter, also referred to as "composite hydroxide particles"), the niobium compound, and the lithium compound (Step S10). The lithium-niobium mixture may be obtained by adding the niobium compound in the form of powder (solid phase) together with the lithium compound to the composite hydroxide particles to be mixed therewith (refer to FIG. 3), for example. The lithium-niobium mixture may be obtained by simultaneously adding a niobium salt solution and an acid to slurry obtained by mixing the composite hydroxide particles and water together to obtain composite hydroxide particles coated with a niobium compound and then mixing the lithium compound therewith, for example (refer to FIG. 4). The following describes the details of the niobium mixing process (Step S10).

The composite hydroxide particles contained in the lithium-niobium mixture are represented by General Formula (2): $Ni_{1-a-b}Mn_aM_b(OH)_{2+\alpha}$ (in Formula (2), M is at least one element selected from Co, W, Mo, V, Mg, Ca, Al, Ti, Cr, Zr, and Ta; and $0.03 \leq a \leq 0.60$, $0 \leq b \leq 0.60$, and $0 \leq \alpha \leq 0.4$). The contents (composition) of the metals (Ni, Mn, and M) in the composite hydroxide particles are almost maintained in the lithium-metal composite oxide 3 finally obtained. Consequently, the contents of the respective metals (Ni, Mn, and M) are preferably within ranges similar to those of the contents in the lithium-metal composite oxide 3 described above.

For the composite hydroxide particles, nickel composite hydroxide particles containing manganese in the above range are used. The composite hydroxide particles contain manganese within the primary particles and can thus fire the lithium-niobium mixture at a relatively high temperature. Firing at a high temperature can uniformly distribute (solid-solve) manganese and niobium within a plurality of primary particles of the positive electrode active material to be obtained. The positive electrode active material in which manganese and niobium are contained (solid-solved) within a plurality of primary particles has high thermal stability and reduces conductivity.

Figure 3:
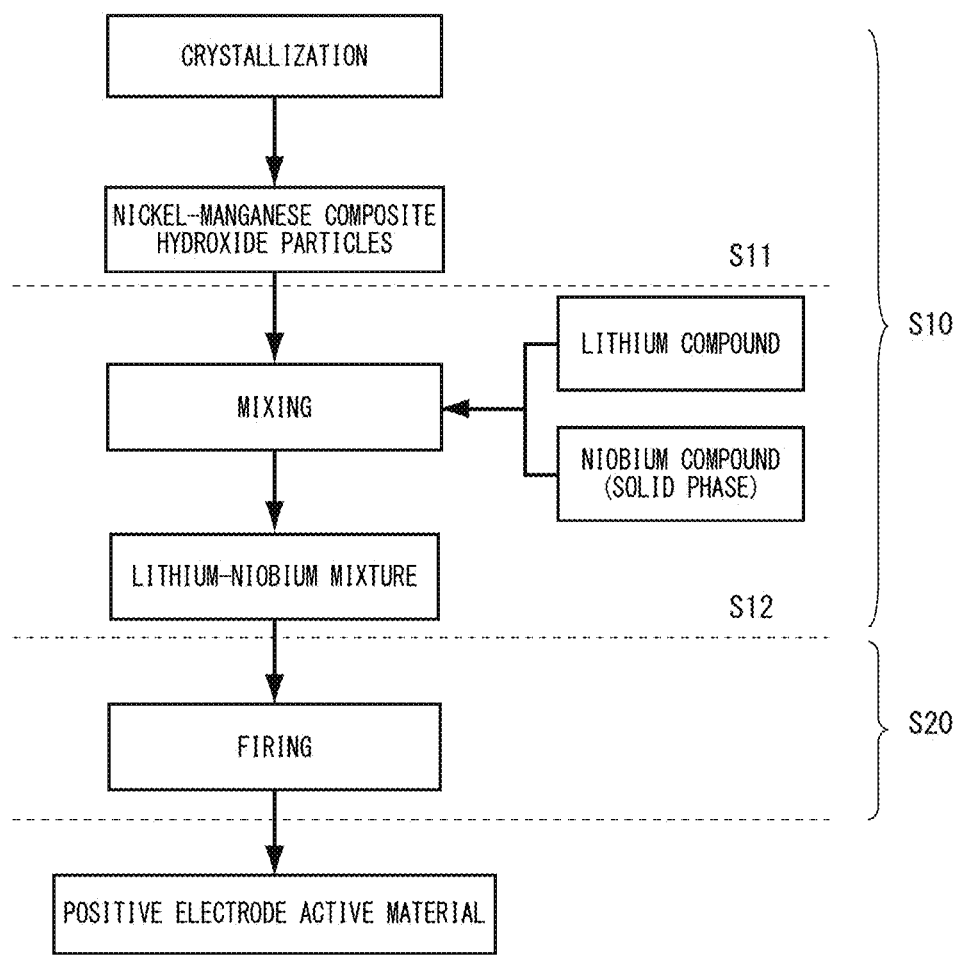
FIG. 3 is a diagram of an exemplary method for producing the positive electrode active material of the present embodiment.

As illustrated in FIG. 3, the niobium mixing process (Step S10) includes a crystallization process (Step S11) of obtaining composite oxide particles by crystallization and a first mixing process (Step S12, hereinafter, also referred to as a "lithium-niobium mixing process") of mixing the obtained composite hydroxide particles, the lithium compound, and the niobium compound together to prepare the lithium-niobium mixture, for example. The following describes the processes.

Figure 4:
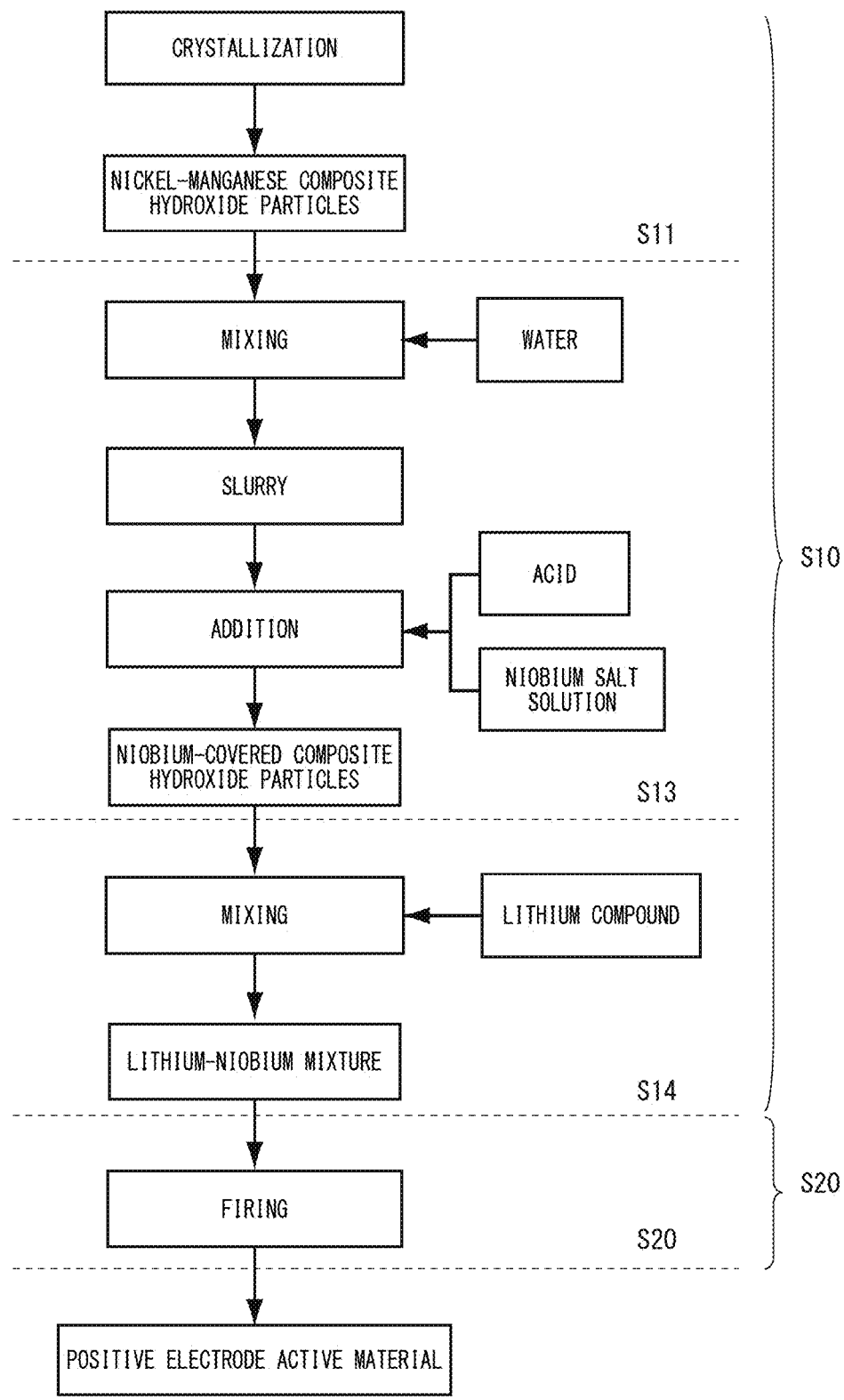
FIG. 4 is a diagram of an exemplary method for producing the positive electrode active material of the present embodiment.

The method for producing the composite hydroxide particles is not limited to a particular method; as illustrated in FIG. 3 and FIG. 4, the composite hydroxide particles obtained by the crystallization process (Step S11) are preferably used. The composite hydroxide particles preferably contain nickel and manganese each uniformly within these particles; the composite hydroxide particles in which the metal elements are uniformly present within the primary particles can be easily produced by the crystallization process (Step S11). In the case of a mixture in which nickel hydroxide particles and a manganese compound are mixed together or nickel hydroxide particles coated with a manganese compound, for example, the distribution of manganese in the positive electrode active material to be obtained is nonuniform, which cannot necessarily sufficiently produce the effect obtained by containing manganese.

(Crystallization Process)

The crystallization process (Step S11) can be performed by any known method so long as it obtains the composite hydroxide particles having the above manganese content; in a reaction tank, a mixed aqueous solution containing at least nickel and manganese is stirred at a constant speed, and a neutralizer is added thereto to perform neutralization and to control pH, whereby the composite hydroxide particles can be formed through coprecipitation, for example.

For the mixed aqueous solution containing nickel and manganese, a sulfate solution, a nitrate solution, and chloride solution of nickel and manganese can be used, for example. As described below, the mixed aqueous solution may contain an additional element M. The composition of the metal elements contained in the mixed aqueous solution nearly matches the composition of the metal elements contained in the composite hydroxide particles to be obtained. Given these circumstances, the composition of the metal elements of the mixed aqueous solution can be adjusted so as to be the same as the target composition of the metal elements of the composite hydroxide particles.

For the neutralizer, an alkaline aqueous solution can be used; sodium hydroxide, potassium hydroxide, or the like can be used, for example.

A complexing agent is preferably added to the mixed aqueous solution together with the neutralizer. The complexing agent is not limited to a particular agent so long as it bonds to nickel ions and ions of other metals to be able to form a complex in an aqueous solution within the reaction tank (hereinafter, also referred to as a "reaction aqueous solution"), and known agents can be used; examples thereof include an ammonium ion supplier. The ammonium ion supplier is not limited to a particular substance; examples thereof include ammonia, ammonium sulfate, ammonium chloride, ammonium carbonate, and ammonium fluoride. By adding the complexing agent, the solubility of metal ions in the reaction aqueous solution can be adjusted.

When the complexing agent is not used, the reaction aqueous solution preferably has a temperature (liquid temperature) within a range of greater than 60° C. and up to 80° C. When the temperature of the reaction aqueous solution is greater than 60° C., the solubility of Ni increases, and a phenomenon in which the precipitation amount of Ni deviates from the target composition not leading to coprecipitation can be avoided. When the temperature of the reaction aqueous solution is greater than 80° C., the amount of evaporation of water is large to increase slurry concentration (the concentration of the reaction aqueous solution), the solubility of Ni reduces, crystals of sodium sulfate and the like occur in the filtrate, and an impurity concentration increases, which may reduce the charging/discharging capacity of the positive electrode active material.

When the complexing agent is not used, the pH of the reaction aqueous solution at the above temperature is preferably at least 10 and up to 12 (with 25° C. as a basis). When the pH of the reaction aqueous solution is greater than 12, the composite hydroxide particles to be obtained are fine particles, filterability is bad, and spherical particles cannot necessarily be obtained. When the pH of the reaction aqueous solution is less than 10, the formation rate of the composite hydroxide particles markedly reduces, Ni remains in a filtrate, the precipitation amount of Ni deviates from a target composition, and a composite hydroxide with a target ratio cannot necessarily be obtained.

When the ammonium ion supplier (the complexing agent) is used at the crystallization process (Step S11), the temperature of the reaction aqueous solution is preferably at least 30° C. and up to 60° C. because the solubility of Ni in the reaction aqueous solution increases, and the pH of the reaction aqueous solution is preferably at least 10 and up to 13 (with 25° C. as a basis).

The ammonia concentration in the reaction aqueous solution is preferably held at a constant value within a range of at least 3 g/L and up to 25 g/L. When the ammonia concentration is less than 3 g/L, the solubility of metal ions cannot be held constant, and the primary particles of the composite hydroxide uniform in shape and particle diameter are not necessarily formed. In addition, gel-like nuclei are likely to be formed, and the particle size distribution of the composite hydroxide particles to be obtained is likely to be widened. When the ammonia concentration is greater than 25 g/L, the solubility of metal ions is extremely high, the amount of metal ions remaining in the reaction aqueous solution increases, and composition deviation or the like of the composite hydroxide particles to be obtained is likely to occur. When the ammonia concentration fluctuates, the solubility of metal ions fluctuates, and uniform hydroxide particles are not formed; the ammonia concentration is preferably held at a constant value. The ammonia concentration is preferably held at a desired concentration with a range between the upper limit and the lower limit of about 5 g/L, for example.

The crystallization process (Step S11) may use batch type crystallization or use continuous crystallization. In the case of the batch type crystallization, for example, the reaction aqueous solution within the reaction tank becomes a stationary state, then a precipitate is collected, filtered, and washed with water to obtain the composite hydroxide particles. In the case of the continuous crystallization, an aqueous solution containing the mixed aqueous solution, an alkaline aqueous solution, and optionally the ammonium ion supplier is continuously supplied and is overflowed from the reaction tank, and a precipitate is collected, filtered, and washed with water to obtain the composite hydroxide particles.

The composite hydroxide particles may contain at least one element selected from Co, W, Mo, V, Mg, Ca, Al, Ti, Cr, Zr, and Ta (hereinafter, also referred to as an "additional element M") as indicated in General Formula (2). The method for adding the additional element M to the composite hydroxide particles is not limited to a particular method, and known methods can be used. In view of improving productivity, for example, a preferred method adds an aqueous solution containing the additional element M to the mixed aqueous solution containing nickel and manganese and coprecipitates composite hydroxide particles containing the additional element M.

Examples of the aqueous solution containing the additional element M include aqueous solutions containing cobalt sulfate, sodium tungstate, tungsten oxide, molybdenum oxide, molybdenum sulfate, vanadium pentaoxide, magnesium sulfate, magnesium chloride, calcium chloride, aluminum sulfate, sodium aluminate, titanium sulfate, ammonium peroxotitanate, titanium potassium oxalate, zirconium hydroxide, zirconium sulfate, chromium chloride, sodium tantalite, and tantalic acid.

In view of optimizing the crystallization condition to make the control of the composition ratio easy, after the composite hydroxide particles are obtained by crystallization, a process of coating the obtained composite hydroxide particles with M may be further provided. The method of coating with the additional element M is not limited to a particular method, and known methods can be used.

The following describes an example of the method of coating with the additional element M. First, the composite hydroxide particles obtained by crystallization are dispersed in pure water to make slurry. Next, a solution containing M corresponding to a target coating amount is mixed with this slurry, and an acid is added dropwise thereto so as to give a certain pH to adjust it. Examples of the acid include sulfuric acid, hydrochloric acid, and nitric acid. Next, the slurry is mixed for a certain period of time and is filtered and dried, whereby composite hydroxide particles coated with the additional element M can be obtained. Examples of other methods of coating include spray drying, in which a solution containing a compound containing M is sprayed onto the composite hydroxide particles and is then dried, and a method that impregnates the composite hydroxide particles with a solution containing a compound containing M.

The method for adding the additional element M to the composite hydroxide particles may include either one or both of adding the additional element M to the above mixed aqueous solution and coating the composite hydroxide particle with the additional element M; 1) a nickel-containing hydroxide crystallized by adding an alkaline aqueous solution to a mixed aqueous solution containing nickel and manganese (however, except the additional element M) may be coated with the additional element M or 2) a mixed aqueous solution containing nickel, manganese, and part of the additional element M is prepared, nickel-manganese composite hydroxide particles (including the additional element M) are coprecipitated, and further the coprecipitate may be coated with the additional element M to adjust the content of M, for example.

(Lithium-Niobium Mixing Process)

The lithium-niobium mixing process (Step S12) is a process of mixing the composite hydroxide particles obtained as described above, the niobium compound, and the lithium compound together to obtain the lithium-niobium mixture.

For the niobium compound, known compounds containing niobium can be used; examples thereof include niobic acid, niobium oxide, niobium nitrate, niobium pentachloride, and niobium nitrate, and among these. In view of availability and preventing impurities from being mixed into the lithium-metal composite oxide 3, the niobium compound is preferably niobic acid, niobium oxide, or a mixture thereof. When impurities are mixed into the lithium-metal composite oxide 3, the secondary battery to be obtained may reduce thermal stability, battery capacity, and cycle characteristics.

The niobium compound is preferably mixed in the form of particle (solid phase). When niobium is added as a solid phase, reactivity at the later firing process (Step S20) changes depending on the particle diameter of the niobium compound, and the particle diameter of the niobium compound to be used is one of the important elements. The average particle diameter of the niobium compound is preferably at least 0.01 µm and up to 10 µm, more preferably at least 0.05 µm and up to 3.0 µm, and even more preferably at least 0.08 µm and up to 1.0 µm. The average particle diameter being less than 0.01 µm may cause a problem in that handling of the powder is extremely difficult or a problem in that the niobium compound scatters at the lithium-niobium mixing process (Step S12) and the firing process (Step S20), and a target composition cannot be added to the active material. When the average particle diameter is greater than 10 µm, Nb is not uniformly distributed in the lithium-metal composite oxide after firing, and thermal stability cannot necessarily be ensured. The average particle diameter is a volume average particle diameter MV and can be determined from a volume integral value measured with a laser diffraction/scattering particle size distribution meter, for example.

The niobium compound may be crushed in advance so as to give a particle diameter within the above range using various kinds of crushers such as a ball mill, a planetary ball mill, a jet mill, a nano jet mill, a beads mill, and a pin mill. The niobium compound may be classified with a dry classifier or by sieving as needed. Sieving can obtain particles with an average particle diameter of nearly 0.01 µm, for example.

The lithium compound is not limited to a particular compound, and known compounds containing lithium can be used; examples thereof include lithium carbonate, lithium hydroxide, lithium nitrate, and mixtures thereof. Among these, in view of less influence of remaining impurities and being dissolved at a firing temperature, preferred are lithium carbonate, lithium hydroxide, and mixtures thereof.

The method for mixing the composite hydroxide particles, the lithium compound, and the niobium compound together is not limited to a particular method, and the composite hydroxide particles, the lithium compound, and the niobium compound may be sufficiently mixed together to the extent that the skeleton of the composite hydroxide particles and the like is not destroyed. As to the method of mixing, mixing can be performed using general mixers, for example; mixing can be performed using a shaker mixer, a Loedige mixer, a Julia mixer, or a V blender, for example. The lithium-niobium mixture is preferably sufficiently mixed before the firing process (Step S20) described below. Insufficient mixing may cause a problem in that a ratio (Li/Me) between Li and metal elements Me other than Li varies among individual particles of the positive electrode active material, and sufficient battery characteristics cannot be obtained.

The lithium compound is mixed such that Li/Me in the lithium-niobium mixture is at least 0.95 and up to 1.20. In other words, the lithium compound is mixed such that Li/Me in the lithium-niobium mixture is the same as Li/Me in the positive electrode active material to be obtained. This is because Li/Me and the molar ratios of the respective metal elements do not change before and after the firing process (Step S20), and Li/Me of the lithium-niobium mixture at this mixing process (Step S12) is Li/Me of the positive electrode active material. The niobium compound is mixed such that a niobium content in the lithium-niobium mixture is at least 0.03 atom % and up to 3 atom % relative to the sum of the metal elements other than Li (Ni, Mn, the additional element M, and Nb) in the lithium-niobium mixture.

As illustrated in FIG. 4, the niobium mixing process (Step S10) may include the crystallization process (Step S11) of obtaining the composite oxide particles by crystallization, a niobium coating process (Step S13) of adding a niobium salt solution and an acid to slurry obtained by mixing the obtained composite hydroxide particles and water together to obtain composite hydroxide particles coated with a niobium compound, and a second mixing process (Step S14, hereinafter, also referred to as a "lithium mixing process") of mixing the composite hydroxide particles coated with a niobium compound and a lithium compound together to obtain a lithium-niobium mixture, for example. The following describes the processes. The crystallization process (Step S11) is a process similar to the above, and a description thereof is omitted.

(Niobium Coating Process)

The niobium coating process (Step S13) is a process of coating the composite hydroxide particles obtained at the crystallization process (Step S11) with a niobium compound. Coating with the niobium compound is performed by adding the niobium salt solution and the acid to the slurry obtained by mixing the composite hydroxide particles and water together to crystallize a niobium compound (e.g., a hydroxide of niobium) on surfaces of the composite hydroxide particles, for example. Such a method for producing niobium-coated composite hydroxide particles is described in WO 2014/034430, for example, and detailed conditions can be adjusted as appropriate by referring to the document or the like.

The niobium salt solution is not limited to a particular solution so long as it is a solution containing a niobium salt having sufficiently high solubility to water; preferred examples thereof include an aqueous solution in which at least one of niobium hydroxide, niobium metal, and niobium pentachloride is dissolved in an aqueous potassium hydroxide solution and a solution in which at least one of niobium hydroxide and niobium pentachloride is dissolved in hydrochloric acid. To obtain the niobium salt solution with a certain concentration, ferroniobium may be dissolved in a potassium hydroxide solution.

The niobium salt solution is preferably produced by dissolving the niobium salt in an aqueous potassium hydroxide solution having a potassium hydroxide concentration of at least 150 g/L and up to 500 g/L and a temperature within a range of greater than 60° C. and up to 90° C. When the concentration of potassium hydroxide is less than 150 g/L, niobium cannot sufficiently be dissolved, and niobium remains in a residue. When the concentration of potassium hydroxide is greater than 500 g/L, it is close to the saturated concentration of potassium hydroxide, and niobium cannot be dissolved therein. When the temperature during dissolution is lower than 60° C., reactivity reduces to take a long time for dissolution. When the temperature is 90° C. or higher, reactivity increases, but the amount of evaporation of water is large, and besides, there is a danger that reaction proceeds vigorously to cause bumping. A niobium salt concentration in the niobium salt solution is preferably at least 5 g/L and up to 40 g/L. When the niobium salt solution is within the above range, the productivity of the composite hydroxide particles coated with a niobium compound can be increased.

Ferroniobium is not limited to any particular shape such as powdery, particulate, or lumpy one and is not limited to a particular one so long as it is generally available. The reaction condition for dissolving ferroniobium preferably includes a potassium hydroxide concentration of 150 to 500 g/L and a range of greater than 60° C. and up to 90° C., although the optimum condition somewhat varies depending on a desired niobium concentration. When ferroniobium is dissolved under the above condition, iron can be left in a residue, and this residue is filtered out to obtain a niobium salt solution dissolving only niobium.

When ortho-niobate ($M_3NbO_4$: M is a monovalent element other than Nb and O) or meta-niobate ($MNbO_3$: M is a divalent element other than Nb and O) is used as the niobium salt for producing the niobium salt solution, when it is tried to be dissolved to obtain the niobium salt solution, it may be hardly dissolved, because hydrolysis or oxidation during dissolution proceeds, which produces niobium hydroxide or insoluble niobium oxide.

The method for adding the niobium salt solution and the acid to the slurry obtained by mixing the composite hydroxide particles and water together is not limited to a particular method, and known methods can be used; while the obtained slurry is stirred, the niobium salt solution and the acid can be simultaneously added thereto so as to give a certain pH, for example. The pH (with 25° C. as a basis) in this process is preferably at least 7 and up to 11 and more preferably at least 7 and less than 9. When the pH is within the above range, metal components in the composite hydroxide particles can be inhibited from being dissolved, and the surfaces of the composite hydroxide particles can be coated with the niobium compound more uniformly. Adding the niobium salt solution and the acid simultaneously produces an effect of making it difficult for niobium hydroxide and the like to precipitate and flocculate as a single body and making it possible for the surface of the composite hydroxide to be uniformly coated.

The acid is not limited to a particular acid, and known acids can be used; in view of being low in price and being easy to be industrially used, preferred are sulfuric acid, hydrochloric acid, and the like. The concentration of the acid to be added is preferably at least 10% by mass and up to 50% by mass relative to the entire acid aqueous solution.

(Lithium Mixing Process)

The lithium mixing process (Step S14) is a process of mixing the composite hydroxide particles coated with a niobium compound described above and a lithium compound together to obtain a lithium-niobium mixture. For the lithium compound used in this process, one similar to that of the lithium-niobium mixing process (Step S12) can be used. The mixing of the composite hydroxide particles coated with a niobium compound and the lithium compound can be performed under a condition similar to that of the lithium-niobium mixing process (Step S12).

(Thermal Treatment Process)

Figure 5:
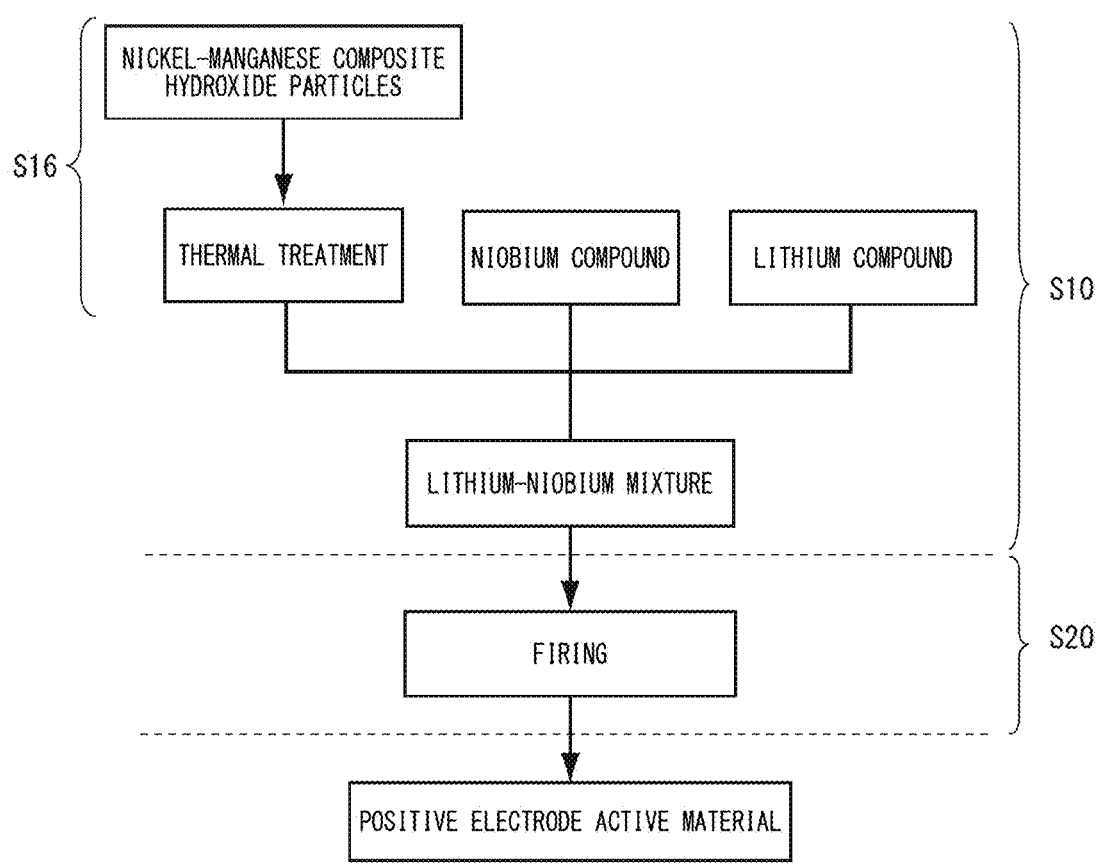
FIG. 5 is a diagram of an exemplary method for producing the positive electrode active material of the present embodiment.

As illustrated in FIG. 5, the method of production of the present embodiment may include a process (Step S16) of thermally treating the composite hydroxide particles or the niobium-coated composite hydroxide particles before the mixing process (Step S12 and Step S14). The thermal treatment process (Step S16) is a process of removing at least part of water contained in the composite hydroxide particles by thermal treatment. By removing at least part of water remaining in the composite hydroxide particles, Li/Me of the positive electrode active material obtained at the firing process (Step S20) can be prevented from varying.

The thermal treatment is, in view of further reducing variations in Li/Me, preferably performed so as to sufficiently oxidize the composite hydroxide particles to transform them into composite oxide particles. Water is only required to be removed to the extent that variations in Li/Me of the positive electrode active material do not occur, and the hydroxide (the composite hydroxide) in all the composite hydroxide particles is not necessarily required to be transformed into the composite oxide. When the thermal treatment process (Step S16) is performed, as illustrated in FIG. 5, the niobium mixing process (Step S10) can prepare the lithium-niobium mixture by thermally treating the composite hydroxide particles before preparing the lithium-niobium mixture and then mixing the composite hydroxide particles and/or the composite oxide particles after the thermal treatment, the lithium compound, and the niobium compound together. When the composite hydroxide particles contain the additional element M, the thermal treatment may be performed after the composite hydroxide particles are coated with a compound containing the additional element M, or the composite hydroxide particles and/or the composite oxide particles after the thermal treatment may be coated with a compound containing the additional element M. When the composite hydroxide particles are coated with the niobium compound described below (refer to FIG. 4), the obtained niobium-coated composite hydroxide particles may be thermally treated, or the niobium-coated composite hydroxide particles and/or niobium-coated composite oxide particles after the thermal treatment and the lithium compound may be mixed together to obtain the lithium-niobium mixture (Step S14).

The thermal treatment may perform heating up to a temperature at which remaining water in the composite hydroxide particles is removed; the temperature of the thermal treatment is preferably at least 105° C. and up to 700° C., for example. When the composite hydroxide particles are heated at 105° C. or higher, at least part of the remaining water can be removed. When the temperature of the thermal treatment is less than 105° C., it takes much time to remove the remaining water, which is industrially inappropriate. When the temperature of the thermal treatment is greater than 800° C., the particles transformed into the composite oxide particles may be sintered and flocculated. When most of the composite hydroxide particles are transformed into the composite oxide particles, for example, the temperature of the thermal treatment is preferably at least 350° C. and up to 700° C.

The atmosphere for performing the thermal treatment is not limited to a particular atmosphere and is, in view of being able to be easily operated, for example, preferably performed in an air flow. The time for the thermal treatment, which is not limited to a particular time, can be at least 1 hour, for example. When the time for the thermal treatment is less than 1 hour, the remaining water in the composite hydroxide particles cannot necessarily sufficiently be removed. The time for the thermal treatment is preferably at least 5 hours and up to 15 hours. The equipment used for the thermal treatment is not limited to particular equipment and may be any one that can heat the composite hydroxide particles in an air flow; preferred examples thereof include blast driers and electric furnaces without gas generation.

At the thermal treatment process (Step S16), the composite hydroxide particles obtained at the crystallization process (Step S11) may be thermally treated (roasted) at at least 150° C. and up to 700° C. for at least 1 hour and up to 10 hours to obtain composite oxide particles represented by General Formula (3): $Ni_{1-a-b}Mn_aM_bO_{1+\beta}$ (in Formula (3), M is at least one element selected from Co, W, Mo, V, Mg, Ca, Al, Ti, Cr, Zr, and Ta; and $0.03 \leq a \leq 0.60$, $0 \leq b \leq 0.60$, and $0 \leq \beta \leq 0.4$), for example. After the thermal treatment (Step S16), the obtained composite oxide particles, a niobium compound, and a lithium compound may be mixed together to be a lithium-niobium mixture.

As another example of the method for producing a positive electrode active material of the present embodiment, the composite oxide particles represented by General Formula (3) may be used in place of the composite hydroxide particles used at the lithium-niobium mixing process (Step S12). The lithium-niobium mixing process (Step S12) may prepare a lithium-niobium mixture containing one or more selected from the nickel-manganese composite hydroxide particles represented by General Formula (2) and the nickel-manganese composite oxide particles represented by General Formula (3); a niobium compound; and a lithium compound. The nickel-manganese composite oxide particles represented by General Formula (3) may be obtained by a method other than the thermal treatment.

[Firing Process]

The firing process (Step S20) is a process of firing the lithium-niobium mixture in an oxidizing atmosphere at at least 750° C. and up to 1,000° C. When the lithium-niobium mixture is fired, lithium in the lithium compound diffuses to the composite hydroxide particles (refer to FIG. 3) or the niobium-coated composite hydroxide particles described below (refer to FIG. 4), and the lithium-metal composite oxide 3 formed of particles with a polycrystalline structure is formed. The lithium compound melts at a temperature during the firing, penetrates into the composite hydroxide particles, and forms the lithium-metal composite oxide 3. In this process, the niobium compound first penetrates into the secondary particle together with the melted lithium compound and even penetrates into among the primary particles if there are grain boundaries or the like. The niobium compound penetrates into the secondary particle and the grain boundaries among the primary particles, whereby the diffusion of niobium within the primary particles is facilitated, and niobium is uniformly solid-solved within the primary particles. In the method of production according to the present embodiment, the amount of niobium added exceeds a solid solving limit into the primary particles, and niobium reacts with excessive lithium, and the lithium-niobium compound is formed on the surfaces of the primary particles, in the grain boundaries, or as a single body.

The firing temperature is at least 750° C. and up to 1,000° C. and preferably at least 750° C. and up to 950° C. in an oxidizing atmosphere. The lower limit of the firing temperature may be at least 800° C. and may be at least 850° C. When being fired at the above temperature, melting of the lithium compound occurs, and the penetration and diffusion of the niobium compound are facilitated. The firing temperature of the lithium-niobium mixture can be raised by containing manganese. By raising the firing temperature, the diffusion of niobium is facilitated, and the formation of the lithium-niobium compound is facilitated. Furthermore, the crystallinity of the lithium-nickel-manganese composite oxide increases, and battery capacity can be further improved.

On the other hand, when the firing temperature is less than 750° C., diffusion of lithium and niobium into the nickel-manganese composite hydroxide particles does not sufficiently occur, and excessive lithium or unreacted particles remain, or the crystal structure is not sufficiently adjusted, thus causing a problem in that sufficient battery characteristics cannot be obtained. When the firing temperature is greater than 1,000° C., sintering violently occurs among the formed lithium-metal composite oxide particles, and abnormal particle growth may occur. When abnormal particle growth occurs, the particles after the firing are made coarse, and the particle form cannot necessarily be held, and when the positive electrode active material is formed, the specific surface area reduces, causing a problem in that the positive electrode resistance increases, and battery capacity reduces.

The firing time is preferably at least 3 hours and more preferably at least 6 hours and up to 24 hours. When the firing time is less than 3 hours, the lithium-transition metal composite oxide is not necessarily sufficiently formed. The atmosphere during the firing is an oxidizing atmosphere and is more preferably an atmosphere with an oxygen concentration of 3 to 100% by volume. That is to say, the firing is preferably performed in an air or oxygen flow. This is because when the oxygen concentration is less than 3% by volume, oxidation cannot sufficiently be performed, and the crystallinity of the lithium-metal composite oxide may be insufficient. Considering battery characteristics in particular, performing in an oxygen flow is preferred. A furnace for use in the firing is not limited to a particular furnace and may be any one that can fire the lithium-niobium mixture in an air or oxygen flow; an electric furnace without gas generation is preferably used. For the firing furnace, either a batch type or continuous furnace can be used.

The firing process (Step S20) may further include, before performing the firing at a temperature of at least 750° C. and up to 1,000° C., a process of performing preliminary firing at a temperature lower than this firing temperature. The preliminary firing is preferably performed at a temperature at which the lithium compound and/or the niobium compound in the lithium-niobium mixture can melt to react with the composite hydroxide particles. The temperature of the preliminary firing can be at least 350° C. and a temperature lower than the firing temperature, for example. The lower limit of the temperature of the preliminary firing is preferably at least 400° C. The lithium-niobium mixture is held (preliminarily fired) at the above temperature range, whereby the lithium compound and/or the niobium compound penetrate into the composite hydroxide particles, the diffusion of lithium and niobium sufficiently occurs, and the lithium-metal composite oxide 3 with a uniform composition can be easily obtained. When lithium hydroxide is used, for example, the preliminary firing is preferably performed while being held at a temperature of at least 400° C. and up to 550° C. for at least 1 hour and about 10 hours.

In the lithium-metal composite oxide obtained by the firing, although sintering among the particles is inhibited, coarse particles may be formed through weak sintering and flocculation. In such a case, the particle size distribution can be adjusted by eliminating the sintering and flocculation by crushing.

(3) Nonaqueous Electrolyte Secondary Battery

The nonaqueous electrolyte secondary battery of the present embodiment (hereinafter, also referred to as a "secondary battery") includes the positive electrode active material described above for its positive electrode. The following describes an example of the secondary battery of the present embodiment for each component. The secondary battery of the present embodiment includes a positive electrode, a negative electrode, and a nonaqueous electrolyte solution and is configured by components similar to those of typical lithium-ion secondary batteries. The embodiment described below is only by way of example, and the nonaqueous electrolyte secondary battery can be achieved with forms to which various modifications and improvements have been made based on the knowledge of those skilled in the art including the following embodiment. The secondary battery is not limited to particular uses.

(Positive Electrode)

Using the above positive electrode active material, the positive electrode of the secondary battery is produced. The following describes an exemplary method for producing the positive electrode. First, the positive electrode active material (powdery), a conductive material, and a binding agent (a binder) are mixed together, active carbon and a solvent for viscosity adjustment or the like are further added thereto as needed, and they are kneaded to produce a positive electrode mixture paste.

The mixture ratio of the materials in the positive electrode mixture is a factor for determining the performance of a lithium secondary battery and can thus be adjusted in accordance with uses. The mixture ratio of the materials can be similar to that of a positive electrode of known lithium secondary batteries; when the total mass of the solid content of the positive electrode mixture excluding the solvent is 100% by mass, 60 to 95% by mass of the positive electrode active material, 1 to 20% by mass of the conductive material, and 1 to 20% by mass of the binding agent can be contained, for example.

The obtained positive electrode mixture paste is applied to the surface of a collector made of aluminum foil and is dried to scatter the solvent to produce a sheet-shaped positive electrode, for example. As needed, pressurizing may be performed using a roll press or the like in order to increase electrode density. The thus obtained sheet-shaped positive electrode is cut or the like into appropriate size in accordance with a target battery to be served for production of the battery. The method for producing the positive electrode is not limited to the exemplified one and may be another method.

Examples of the conductive material include graphite (natural graphite, artificial graphite, expanded graphite, and the like) and carbon black materials such as acetylene black and Ketjen black.

Examples of the binding agent (binder), which plays a role of binding active material particles, include polyvinylidene fluoride (PVDF), polytetrafluoroethylene (PTFE), fluoro rubber, ethylene-propylene-diene rubber, styrene butadiene, cellulosic resins, and polyacrylic acid.

A solvent that disperses the positive electrode active material, the conductive material, and the active carbon and dissolves the binding agent is added to the positive electrode mixture as needed. Specific examples of the solvent include organic solvents such as N-methyl-2-pyrrolidone. Active carbon can be added to the positive electrode mixture in order to increase electric double layer capacity.

(Negative Electrode)

Examples of the negative electrode include metal lithium, lithium alloys. The negative electrode may be formed by applying a negative electrode mixture obtained by mixing a binding agent with a negative electrode active material that can occlude and de-insert lithium ions and adding an appropriate solvent to be paste form to the surface of a metal foil collector such as copper, drying, and compressing it in order to increase electrode density as needed.

Examples of the negative electrode active material include natural graphite, artificial graphite, organic compound fired bodies such as phenol resin, and powder of carbon substances such as coke. In this case, examples of a negative electrode binding agent include fluorine-containing resins such as PVDF similarly to the positive electrode. Examples of a solvent in which the active material and the binding agent are dispersed include organic solvents such as N-methyl-2-pyrrolidone.

(Separator)

A separator is interposed between the positive electrode and the negative electrode. The separator separates the positive electrode and the negative electrode from each other and holds an electrolyte, and known separators can be used; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Secondary Battery)

The nonaqueous electrolyte secondary battery according to the present embodiment including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

(Characteristics of Secondary Battery)

The secondary battery according to the present embodiment can achieve both high battery capacity and durability, and high thermal stability caused by inhibition of oxygen release at the time of overcharging. The positive electrode active material contained in the secondary battery according to the present embodiment can be produced by the industrial method of production described above. Consequently, the secondary battery according to the present embodiment can be suitably used for power supplies of small-sized portable electronic devices (such as notebook personal computers and cellular phone terminals), power supplies for electric vehicles, and power supplies for hybrid cars, which always require high capacity.

EXAMPLES

The following describes the present invention in more detail with reference to examples and comparative examples of the present invention; the present invention is not limited by these examples at all. Methods for analyzing metals contained in the positive electrode active materials and various kinds of methods for evaluating the positive electrode active materials in the examples and the comparative examples are as follows:

(1) Composition Analysis

The compositions of the obtained nickel-manganese composite hydroxide and positive electrode active materials were measured by ICP emission spectrometry.

(2) Average Particle Diameter MV

Measurement of an average particle diameter (a volume average particle diameter MV) was performed with a laser diffraction/scattering particle size distribution measurement apparatus (Microtrac HRA manufactured by Nikkiso Co., Ltd.).

(3) Detection of Crystallite Diameter and Lithium-Niobium Compound

Using an XRD diffraction apparatus (X'Pert PRO manufactured by Panalytical), quantitative evaluation of the crystal structure of the obtained positive electrode active material and the lithium-niobium compound was performed. For the 003-crystallite diameter, analysis of a peak of the (003) plane present near $2\theta=18°$ was performed from an XRD measurement result, and it was calculated using the Scherrer equation.

(4) Niobium Concentration

The positive electrode active material was processed so as to enable sectional analysis of the primary particles with a S-TEM. From a plurality of secondary particles contained in the positive electrode active material, 30 primary particles were arbitrarily selected, and line analysis was performed on the composition within sections of individual primary particles by EDX of S-TEM. In this process, for the direction of the line analysis, a direction in which a measured value of a niobium concentration near the surface of the primary particle is not influenced by the presence of a niobium compound on the surfaces of the primary particle by performing surface analysis in advance and in which analysis for a length of at least 50% of the maximum length of the primary particle was enabled was selected. From measured values of the niobium concentration obtained by the line analysis, a maximum niobium concentration and an average niobium concentration within the primary particles were determined, the ratios of the maximum niobium concentration of the individual primary particles were each calculated, and the ratios of the maximum niobium concentration calculated from the respective primary particles were number-averaged to determine the ratio of the maximum niobium concentration of the positive electrode active material.

(5) Initial Charging Capacity and Initial Discharging Capacity

Figure 7:
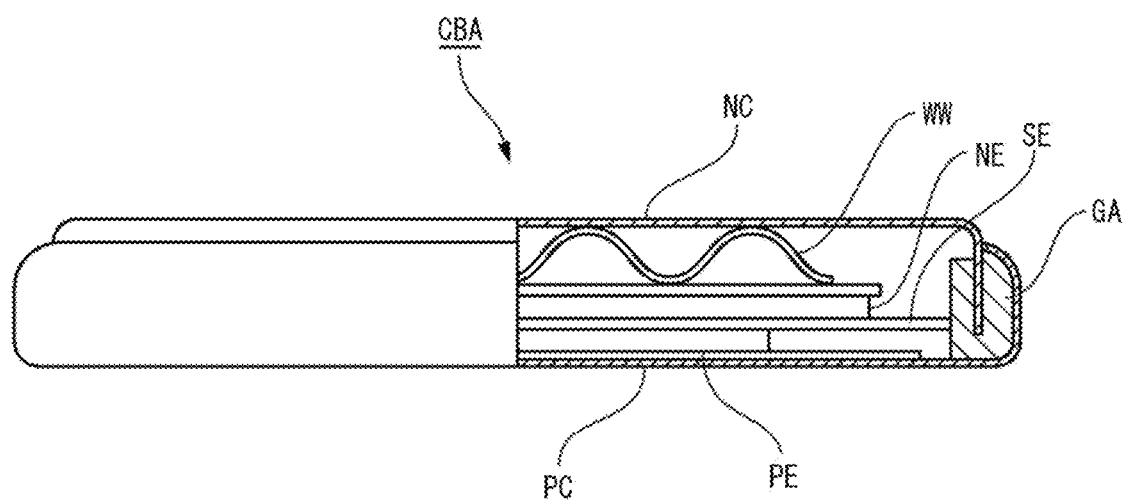
FIG. 7 is a schematic diagram of a coin-type battery used for battery evaluation.

For initial charging capacity and initial discharging capacity, a coin-type battery CBA illustrated in FIG. 7 was produced and was allowed to stand for about 24 hours and was charged to a cutoff voltage 4.3 V with a current density to the positive electrode of 0.1 mA/cm$^2$ after an open circuit voltage (OCV) stabilized, and a capacity at that time was determined to be the initial charging capacity; a capacity when it was discharged to a cutoff voltage 3.0 V after a one-hour suspension was determined to be the initial discharging capacity. For the measurement of the discharging capacity, a multi-channel voltage/current generator (R6741A manufactured by Advantest Corporation) was used.

The coin-type battery CBA was produced by the following method. First, mixed together were 52.5 mg of the obtained positive electrode active material, 15 mg of acetylene black, and 7.5 mg of a polytetrafluoroethylene resin (PTFE), and the resultant mixture was press-formed at a pressure of 100 MPa to a diameter of 11 mm and a thickness of 100 μm to form a positive electrode (an electrode for evaluation) PE illustrated in FIG. 7. The produced positive electrode PE was dried in a vacuum drier at 120° C. for 12 hours, and then using this positive electrode PE, a 2032 type coin battery CBA was produced in a glove box in an Ar atmosphere and the dew point of which was controlled to −80° C. For a negative electrode NE, lithium (Li) metal with a diameter of 17 mm and a thickness of 1 mm was used. For an electrolyte solution, a liquid mixture of an equivalent amount of ethylene carbonate (EC) and diethyl carbonate (DEC) with 1 M LiClO$_4$ as a supporting electrolyte (manufactured by Tomiyama Pure Chemical Industries, Ltd.) was used. For a separator SE, a polyethylene porous film with a film thickness of 25 μm was used. The coin battery has a gasket GA and a wave washer WW, and the coin-type battery was assembled with a positive electrode can PC and a negative electrode can NC.

(6) Durability Evaluation

Figure 8:
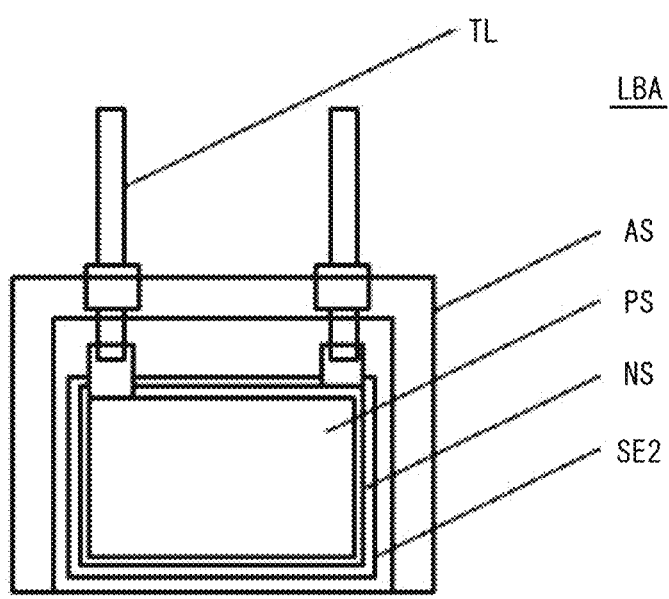
FIG. 8 is a schematic diagram of a laminate-type battery used for battery evaluation.

For the evaluation of the gas generation amount of the positive electrode active material, a laminate-type battery LBA illustrated in FIG. 8 was used.

The laminate-type battery LBA was produced by the following method. First, the obtained positive electrode active material was mixed with acetylene black (a conductive material) and PVDF (a binder) so as to give a mass ratio of 85:10:5, which was dispersed in N-methyl-2-pyrrolidone (NMP) as a solvent to make slurry. This positive electrode slurry was applied to an aluminum foil (a positive electrode collector) with a thickness of 20 μm using an applicator with 7 mg/cm$^2$ per unit area. The applied film was then dried with a blast drier at 120° C.×30 minutes and was rolled with a roll press to obtain a positive electrode PS with 5.0 cm×3.0 cm. For a negative electrode NS, a negative electrode material for a lithium-ion secondary battery (natural graphite-based) manufactured by Mitsubishi Chemical Corporation and acetylene black were mixed together so as to give a mass ratio of 97:3, which was dispersed in NMP as a solvent to make slurry. This negative electrode slurry was applied to a Cu collector (a negative electrode collector) with a thickness of 15 μm using an applicator with a thickness of 5.0 mg/cm$^2$. The applied film was then dried with a blast drier at 120° C.×30 minutes, and the dried electrode was rolled using a roll press. The negative electrode sheet after rolling was cut out into a rectangle with 5.4 cm×3.4 cm with a band-shaped part (a terminal) with a width of 10 mm protruding from one corner, the active material layer was removed from the band-shaped part, the copper foil was exposed to form a terminal part, and a negative electrode sheet NS with a terminal was obtained. For a separator SE2, a polyethylene separator with a thickness of 16 μm, which is generally used, was used. For an electrolyte solution, a liquid mixture of ethylene carbonate (EC) and dimethyl carbonate (DMC) with a volume ratio of EC/DMC=3:7 containing 1 mol/L LiPF$_6$ as a supporting electrolyte was used. Using the foregoing members, the positive electrode PS and the negative electrode NS were stacked via the separator SE2 to form an electrode part, the obtained electrode part was impregnated with the electrode solution and was hermetically sealed in a battery case to assemble the laminate-type battery LBA.

The obtained laminate-type battery LBA was subjected to 500 cycles of a charging/discharging cycle (2 C rate, 3.0-4.1 V) including CC charging at a temperature of 60° C. up to 4.1 V at a rate of 2 C, suspending for 10 minutes, CC discharging to 3.0 V at the same rate, and suspending for 10 minutes. Discharging capacities at the first cycle and the 500th cycle were measured, and the percentage of the 2 C discharging capacity at the 500th cycle to the 2 C discharging capacity at the first cycle was determined to be a capacity maintenance rate (%).

(7) Thermal Stability Evaluation

The thermal stability evaluation of the positive electrode was performed by making the positive electrode active material an overcharged state and quantifying the amount of oxygen released by being heated. The coin-type battery CBA similar to (5) was produced and was CCCV-charged (constant current-constant voltage charged) to a cutoff voltage of 4.5 V at a rate of 0.2 C. Then the coin-type battery was disassembled, and only the positive electrode was taken out carefully so as not to cause a short circuit, was washed with dimethyl carbonate (DMC), and was dried. About 2 mg of the positive electrode after being dried was weighed out, and its temperatures was raised from room temperature to 450° C. at a temperature raising rate of 10° C./min using a gas chromatograph mass spectrometer (GCMS, QP-2010plus manufactured by Shimadzu Corporation). For a carrier gas, helium was used. The generation behavior of oxygen (m/z=32) generated during heating was measured, and an oxygen generation amount was semi-quantitated from the obtained maximum oxygen generation peak height (intensity) and peak area, which were used as evaluation indicators of thermal stability. The semi-quantitated value of the oxygen generation amount was calculated by injecting a pure oxygen gas into GCMS as a standard sample and extrapolating a calibration curve obtained from a measurement result thereof.

Examples 1

(Crystallization Process)

A certain amount of pure water was put into a reaction tank (60 L), and the intra-tank temperature was set to 45° C. while stirring it. In this process, a N$_2$ gas was passed through the reaction tank and was adjusted so as to give a dissolved oxygen concentration in the liquid in the reaction tank of 0.8 mg/L. A 2.0 M mixed aqueous solution of nickel sulfate, cobalt sulfate, and manganese sulfate, a 25% by mass sodium hydroxide solution as an alkaline solution, and a 25% by mass ammonia water as a complexing agent were added to this reaction tank simultaneously and continuously so as to give a molar ratio among nickel:cobalt:manganese within this reaction tank of 60:20:20. In this process, the flow was controlled so as to give a residence time of the mixed aqueous solution of 8 hours, the pH within the reaction tank was adjusted to be 11.8 to 12.1, and the ammonia concentration was adjusted to be 12 to 13 g/L. After the reaction tank stabilized, slurry containing a nickel-cobalt-manganese composite hydroxide was collected from an overflow port and was then filtered to obtain a cake of the nickel-cobalt-manganese composite hydroxide (the crystallization process). Then 1 L of pure water was passed through 140 g of the nickel-cobalt-manganese composite hydroxide within a Denver after filtration to wash away impurities. The powder after being washed was dried to obtain nickel-cobalt-manganese composite hydroxide particles represented by $Ni_{0.60}Co_{0.20}Mn_{0.20}(OH)_{2+\alpha}$ ($0 \le \alpha \le 0.4$). The average particle diameter MV of the obtained composite hydroxide was 9.9 μm.

(Lithium-Niobium Mixing Process)

The obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 59.1:19.2:19.2:2.5 and an atomic ratio between a lithium amount (Li) and the total metal amount (Me) of nickel, cobalt, manganese, and niobium (hereinafter, referred to as Li/Me) of 1.03 and were then sufficiently mixed together using a shaker mixer (TURBULA Type T2C manufactured by Willy A. Bachofen (WAB)) to obtain a lithium mixture.

(Firing Process)

The obtained lithium mixture was fired by holding it in an air (oxygen: 21% by volume) flow at 900° C. for 10 hours and was then crushed to obtain a positive electrode active material containing a lithium-nickel-cobalt-manganese-niobium composite oxide.

Table 1 lists the volume average particle diameter MV of the obtained positive electrode active material. From a result of XRD measurement, a peak attributed to $Li_3NbO_4$ (ICDD card No. 75-902) was determined. In addition, an increase in the lattice constants a and c of the lithium-nickel-cobalt-manganese composite oxide was recognized. From a result of STEM-EDX analysis, it was determined that niobium was solid-solved in the crystal structure (FIG. 6(A) and FIG. 6(B)). From a result of EDX line analysis, segregation estimated to be the lithium-niobium compound was determined in grain boundaries and the surface of the active material (the * part in FIG. 6(B)). In combination with the result of XRD measurement, this compound is estimated to be $Li_3NbO_4$. Furthermore, from the result of XRD measurement, the crystallite diameter of the (003) plane was calculated using the Scherrer equation to be 1,005 Å (100.5 nm)

(Electrochemical Characteristics Evaluation)

Initial characteristics evaluation (initial charging/discharging capacity), durability evaluation, and thermals stability evaluation of a secondary battery containing the obtained positive electrode active material were performed by the respective methods described above. Table 2 lists these evaluation results.

Example 2

A positive electrode active material was obtained and evaluated similarly to Example 1 except that the nickel-cobalt-manganese composite hydroxide particles, lithium carbonate, and niobic acid ($Nb_2O_5nH_2O$) with an average particle diameter of 1.0 μm were weighed so as to give a molar ratio among nickel:cobalt:manganese:niobium of 58.8:19.0:19.0:3.2. Table 1 and Table 2 list evaluation results.

Example 3

(Crystallization Process)

Similarly to the crystallization process of Example 1, nickel-cobalt-manganese composite hydroxide particles represented by $Ni_{0.60}Co_{0.20}Mn_{0.20}(OH)_{2+\alpha}$ $(0 \leq \alpha \leq 0.4)$ were obtained.

(Niobium Coating Process)

Next, a niobic acid ($Nb_2O_5 \cdot nH_2O$) powder was dissolved in a potassium hydroxide solution with a concentration of 300 g/L so as to give a niobium concentration of 30 g/L by maintaining a dissolution temperature constant at 80° C. with stirring for 2 hours, and then the residue was filtered out to produce a niobium salt solution. To slurry obtained by mixing the nickel-cobalt-manganese composite hydroxide and pure water together, the niobium salt solution and a 25% by mass aqueous sulfuric acid solution were simultaneously added dropwise so as to give a pH of 8.0 while being held at a liquid temperature of 25° C. to obtain a nickel-cobalt composite hydroxide coated with a niobium compound. A target niobium addition amount was set to 2.5 (molar ratio).

(Lithium Mixing Process and Firing Process)

The obtained niobium-coated nickel-cobalt-manganese composite hydroxide particles and lithium carbonate were weighed so as to give an atomic ratio between lithium and the total metal amount of nickel, cobalt, manganese, and niobium (hereinafter, referred to as Li/Me) of 1.03 and were sufficiently mixed together using a shaker mixer (TURBULA Type T2C manufactured by Willy A. Bachofen (WAB)) to obtain a lithium mixture. The firing process and the subsequent were performed similarly to those of Example 1 to obtain and evaluate a positive electrode active material. Table 1 and Table 2 list evaluation results.

Example 4

A positive electrode active material was obtained and evaluated similarly to Example 3 except that after nickel-cobalt-manganese composite hydroxide particles represented by $Ni_{0.60}Co_{0.20}Mn_{0.20}(OH)_{2+\alpha}$ $(0 \leq \alpha \leq 0.4)$ were obtained similarly to the crystallization process of Example 1, the target niobium addition amount was set to 3.2 (a molar ratio). Table 1 and Table 2 list evaluation results.

Example 5

A positive electrode active material was obtained and evaluated similarly to Example 1 except that the obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 58.0:18.0:18.0:6.0 and Li/Me of 1.03. Table 1 and Table 2 list evaluation results.

Comparative Example 1

A positive electrode active material was obtained and evaluated similarly to Example 1 except that the obtained nickel-cobalt-manganese composite hydroxide particles and lithium carbonate were weighed so as to give a molar ratio among nickel:cobalt:manganese:niobium of 60.0:20.0:20.0:0.0 and Li/Me of 1.03. Table 1 and Table 2 list evaluation results.

Comparative Example 2

A positive electrode active material was obtained and evaluated similarly to Example 1 except that the obtained nickel-cobalt-manganese composite hydroxide particles, lithium carbonate, and niobic acid ($Nb_2O_5 nH_2O$) with an average particle diameter of 1.0 μm were weighed so as to give a molar ratio among nickel:cobalt:manganese:niobium of 59.6:19.7:19.7:1.0 and Li/Me of 1.03. Table 1 and Table 2 list evaluation results. FIG. 4 shows a SEM image of the obtained positive electrode active material.

Comparative Example 3

A positive electrode active material was obtained and evaluated similarly to Example 1 except that the obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 57.1:17.2:17.2:8.5 and Li/Me of 1.03. Table 1 and Table 2 list evaluation results.

Comparative Example 4

A positive electrode active material was obtained and evaluated similarly to Example 1 except that the lithium mixture was held and fired in an air (oxygen: 21% by volume) flow at 1,020° C. for 10 hours. Table 1 and Table 2 list evaluation results.

Comparative Example 5

A positive electrode active material was obtained and evaluated similarly to Example 1 except that the lithium mixture was held and fired in an air (oxygen: 21% by volume) flow at 700° C. for 10 hours. Table 1 and Table 2 list evaluation results.

TABLE 1

| | Production condition | | | | | | | | Positive electrode active material | | | | | |
|---|---|---|---|---|---|---|---|---|---|---|---|---|---|---|
| | Nb addition amount at % | Method for adding Nb | Firing temperature ° C. | General Formula (1) | | | | | Average particle diameter MV μm | 003 Crystallite diameter nm | Average degree of circularity | Nb solid-solving within primary particles | Nb concentration ratio (maximum/average) | Nb compound on surfaces of primary particles |
| | | | | Li d | Ni 1-a-b-c | Mn a | Co b | Nb c | | | | | | |
| Example 1 | 2.5 | Solid phase addition | 900 | 1.03 | 0.591 | 0.192 | 0.192 | 0.025 | 11.3 | 100.5 | 0.80 | Present | 1.9 | $Li_3NbO_4$ |

TABLE 1-continued

| | Production condition | | | Positive electrode active material | | | | | | | | | |
|---|---|---|---|---|---|---|---|---|---|---|---|---|---|
| | | | | General Formula (1) | | | | Average particle diameter | 003 Crystallite diameter | Average degree of circularity | Nb solid-solving within primary particles | Nb concentration ratio (maximum/average) | Nb compound on surfaces of primary particles |
| | Nb addition amount at % | Method for adding Nb | Firing temperature °C. | Li d | Ni 1-a-b-c | Mn a | Co b | Nb c | MV μm | nm | | | | |
| Example 2 | 3.2 | Solid phase addition | 900 | 1.03 | 0.588 | 0.190 | 0.190 | 0.032 | 10.6 | 93.4 | 0.82 | Present | 2.8 | $Li_3NbO_4$ |
| Example 3 | 2.5 | Coating | 900 | 1.03 | 0.591 | 0.192 | 0.192 | 0.025 | 11.5 | 106.7 | 0.81 | Present | 1.8 | $Li_3NbO_4$ |
| Example 4 | 3.2 | Coating | 900 | 1.03 | 0.596 | 0.190 | 0.190 | 0.032 | 10.6 | 95.0 | 0.84 | Present | 2.7 | $Li_3NbO_4$ |
| Example 5 | 6.0 | Solid phase addition | 900 | 1.03 | 0.58 | 0.18 | 0.18 | 0.06 | 9.7 | 72.1 | 0.88 | Present | 3.1 | $Li_3NbO_4$, $LiNbO_3$ |
| Comparative Example 1 | 0.0 | — | 900 | 1.03 | 0.60 | 0.20 | 0.20 | 0.00 | 12.7 | 174.1 | 0.65 | Absent | — | — |
| Comparative Example 2 | 1.0 | Solid phase addition | 900 | 1.03 | 0.586 | 0.197 | 0.197 | 0.01 | 12.0 | 139.0 | 0.79 | Present | 1.7 | Absent |
| Comparative Example 3 | 8.5 | Solid phase addition | 900 | 1.03 | 0.571 | 0.172 | 0.172 | 0.085 | 9.7 | 46.3 | 0.86 | Present | 3.6 | $Li_3NbO_4$, $LiNbO_3$ |
| Comparative Example 4 | 2.5 | Solid phase addition | 1020 | 1.03 | 0.587 | 0.191 | 0.197 | 0.025 | 12.5 | 133.0 | 0.58 | Present | 3.3 | $Li_3NbO_4$ |
| Comparative Example 5 | 2.5 | Solid phase addition | 700 | 1.03 | 0.587 | 0.191 | 0.197 | 0.025 | 10.1 | 48.7 | 0.64 | Present | 2.1 | $Nb_2O_5$, $LiNbO_3$ |

TABLE 2

| | Initial characteristics (coin-type battery) | | Durability (laminate-type battery) | | | Thermal stability | |
|---|---|---|---|---|---|---|---|
| | Initial charging capacity mAh/g | Initial discharging capacity mAh/g | Initial discharging capacity mAh/g | Discharging capacity after 500 cycles mAh/g | Capacity maintenance rate % | Maximum oxygen generation peak intensity | Oxygen generation amount wt % |
| Example 1 | 192.0 | 174.2 | 138.5 | 128.5 | 92.8 | 50 | 3.5 |
| Example 2 | 186.8 | 158.6 | 133.4 | 122.9 | 92.1 | 42 | 3.2 |
| Example 3 | 193.0 | 175.2 | 140.1 | 128.0 | 91.4 | 43 | 3.4 |
| Example 4 | 193.4 | 174.1 | 134.6 | 123.2 | 91.5 | 40 | 3.3 |
| Example 5 | 192.0 | 174.2 | 117.6 | 105.4 | 89.6 | 40 | 3.0 |
| Comparative Example 1 | 191.4 | 174.0 | 150.0 | 103.6 | 69.1 | 100 | 5.6 |
| Comparative Example 2 | 193.4 | 174.1 | 151.5 | 55.7 | 36.8 | 37 | 3.9 |
| Comparative Example 3 | 108.7 | 92.6 | 100.6 | 80.9 | 80.4 | 39 | 3.0 |
| Comparative Example 4 | 158.6 | 140.3 | 106.8 | 88.3 | 82.7 | 41 | 3.4 |
| Comparative Example 5 | 128.0 | 107.5 | 78.5 | 68.0 | 86.6 | 35 | 2.8 |

Examples 6

(Crystallization Process)

A certain amount of pure water was put into a reaction tank (60 L), and the intra-tank temperature was set to 45° C. while stirring it. In this process, a $N_2$ gas was passed through the reaction tank and was adjusted so as to give a dissolved oxygen concentration in the liquid in the reaction tank of 1.5 mg/L. A 2.0 M mixed aqueous solution of nickel sulfate, cobalt sulfate, and manganese sulfate, a 25% by mass sodium hydroxide solution as an alkaline solution, and a 25% by mass ammonia water as a complexing agent were added to this reaction tank simultaneously and continuously so as to give a molar ratio among nickel:cobalt:manganese within this reaction tank of 80:10:10. In this process, the flow was controlled so as to give a residence time of the mixed aqueous solution of 8 hours, the pH within the reaction tank was adjusted to be 11.8 to 12.1, and the ammonia concentration was adjusted to be 12 to 13 g/L. After the reaction tank stabilized, slurry containing a nickel-cobalt-manganese composite hydroxide was collected from an overflow port and was then filtered to obtain a cake of the nickel-cobalt-manganese composite hydroxide (the crystallization process). Then 1 L of pure water was passed through 140 g of the nickel-cobalt-manganese composite hydroxide within a Denver after filtration to wash away impurities. The powder after being washed was dried to obtain nickel-cobalt-manganese composite hydroxide particles represented by $Ni_{0.80}Co_{0.10}Mn_{0.10}(OH)_{2+\alpha}$ ($0 \leq \alpha \leq 0.4$). The volume average particle diameter MV of the obtained composite hydroxide was 10.0 μm.

(Lithium Mixing Process)

The obtained nickel-cobalt-manganese composite hydroxide particles, lithium hydroxide, and niobic acid ($Nb_2O_5 \cdot nH_2O$) with an average particle diameter of 1.0 μm were weighed so as to give a molar ratio among nickel:cobalt:manganese:niobium of 78.0:9.8:9.4:2.5 and an atomic ratio between a lithium amount (Li) and the total metal amount (Me) of nickel, cobalt, manganese, and niobium (hereinafter, referred to as Li/Me) of 1.02 and were then sufficiently mixed together using a shaker mixer (TURBULA Type T2C manufactured by Willy A. Bachofen (WAB)) to obtain a lithium mixture.

(Firing Process)

The obtained lithium mixture was fired by holding it in an oxygen flow at 870° C. for 10 hours and was then crushed to obtain a positive electrode active material containing a lithium-nickel-cobalt-manganese-niobium composite oxide. Table 3 and Table 4 list evaluation results.

Example 7

(Crystallization Process)

Similarly to the crystallization process of Example 6, nickel-cobalt-manganese composite hydroxide particles represented by $Ni_{0.80}Co_{0.10}Mn_{0.10}(OH)_{2+\alpha}$ ($0 \leq \alpha \leq 0.4$) were obtained.

(Niobium Coating Process)

Next, a niobic acid ($Nb_2O_5 \cdot nH_2O$) powder was dissolved in a potassium hydroxide solution with a concentration of 300 g/L so as to give a niobium concentration of 30 g/L by maintaining a dissolution temperature constant at 80° C. with stirring for 2 hours, and then the residue was filtered out to produce a niobium salt solution. To slurry obtained by mixing the nickel-cobalt-manganese composite hydroxide and pure water together, the niobium salt solution and a 25% by mass aqueous sulfuric acid solution were simultaneously added dropwise so as to give a pH of 8.0 while being held at a liquid temperature of 25° C. to obtain a nickel-cobalt composite hydroxide coated with a niobium compound. A target niobium addition amount was set to 2.5 (molar ratio).

(Lithium Mixing Process and Firing Process)

The obtained niobium-coated nickel-cobalt-manganese composite hydroxide particles and lithium hydroxide were weighed so as to give an atomic ratio between lithium and the total metal amount of nickel, cobalt, manganese, and niobium (hereinafter, referred to as Li/Me) of 1.02 and were sufficiently mixed together using a shaker mixer (TURBULA Type T2C manufactured by Willy A. Bachofen (WAB)) to obtain a lithium mixture. The firing process and the subsequent were performed similarly to those of Example 6 to obtain and evaluate a positive electrode active material. Table 3 and Table 4 list evaluation results.

Example 8

A positive electrode active material was obtained and evaluated similarly to Example 6 except that the nickel-cobalt-manganese composite hydroxide particles, lithium hydroxide, and niobic acid ($Nb_2O_5 \cdot nH_2O$) with an average particle diameter of 1.0 μm were weighed so as to give a molar ratio among nickel:cobalt:manganese:niobium of 77.5:9.7:9.6:3.2 and Li/Me of 1.02. Table 3 and Table 4 list evaluation results.

Comparative Example 6

A positive electrode active material was obtained and evaluated similarly to Example 6 except that the nickel-cobalt-manganese composite hydroxide particles and lithium carbonate were weighed so as to give a molar ratio among nickel:cobalt:manganese of 80.0:10.0:10.0 and Li/Me of 1.02. Table 3 and Table 4 list evaluation results.

Comparative Example 7

A positive electrode active material was obtained and evaluated similarly to Example 6 except that the nickel-cobalt-manganese composite hydroxide particles, lithium hydroxide, and niobic acid ($Nb_2O_5 \cdot nH_2O$) with an average particle diameter of 1.0 μm were weighed so as to give a molar ratio among nickel:cobalt:manganese:niobium of 79.3:10.0:9.7:1.0 and Li/Me of 1.02. Table 3 and Table 4 list evaluation results.

Comparative Example 8

A positive electrode active material was obtained and evaluated similarly to Example 6 except that the nickel-cobalt-manganese composite hydroxide particles, lithium hydroxide, and niobic acid ($Nb_2O_5 \cdot nH_2O$) with an average particle diameter of 1.0 μm were weighed so as to give a molar ratio among nickel:cobalt:manganese:niobium of 73.3:9.0:9.2:8.5. Table 3 and Table 4 list evaluation results.

TABLE 3

| | Production condition | | | Positive electrode active material | | | | | | | | | |
|---|---|---|---|---|---|---|---|---|---|---|---|---|---|
| | | | | General Formula (1) | | | | Average particle diameter | 003 Crystallite diameter | Average degree of circularity | Nb solid-solving within primary particles | Nb concentration ratio (maximum/ average) | Nb compound on surfaces of primary particles |
| | Nb addition amount at % | Method for adding Nb | Firing temperature ° C. | Li d | Ni 1-a-b-c | Mn a | Co b | Nb c | MV μm | meter nm | — | — | — | — |
| Example 6 | 2.5 | Solid phase addition | 870 | 1.02 | 0.780 | 0.094 | 0.098 | 0.025 | 11.0 | 99.8 | 0.80 | Present | 1.9 | LiNbO$_3$ |
| Example 7 | 2.5 | Coating | 870 | 1.02 | 0.780 | 0.094 | 0.098 | 0.025 | 11.6 | 101.3 | 0.81 | Present | 1.8 | LiNbO$_3$ |
| Example 8 | 3.2 | Solid phase addition | 870 | 1.02 | 0.775 | 0.097 | 0.096 | 0.032 | 10.4 | 98.6 | 0.79 | Present | 2.8 | Li$_5$NbO$_5$, LiNbO$_3$ |
| Comparative Example 6 | 0.0 | Solid phase addition | 870 | 1.02 | 0.800 | 0.100 | 0.100 | 0.000 | 14.3 | 165.6 | 0.58 | Absent | — | Absent |
| Comparative Example 7 | 1.0 | Solid phase addition | 870 | 1.02 | 0.793 | 0.097 | 0.100 | 0.010 | 11.9 | 140.7 | 0.78 | Present | 1.5 | Absent |
| Comparative Example 8 | 8.5 | Solid phase addition | 870 | 1.02 | 0.733 | 0.092 | 0.090 | 0.085 | 9.8 | 38.7 | 0.83 | Present | 4.0 | Li$_5$NbO$_5$, LiNbO$_3$ |

TABLE 4

| | Initial characteristics (coin-type battery) | | Durability (laminate-type battery) | | Thermal stability | |
|---|---|---|---|---|---|---|
| | | | Discharging | | Maximum oxygen | |
| | Initial charging capacity mAh/g | Initial discharging capacity mAh/g | Initial discharging capacity mAh/g | capacity after 500 cycles mAh/g | Capacity maintenance rate % | generation peak intensity — | Oxygen generation amount wt % |
| Example 6 | 208.7 | 175.2 | 152.6 | 132.1 | 86.6 | 68 | 7.6 |
| Example 7 | 209.2 | 176.4 | 155.4 | 135.5 | 87.2 | 65 | 7.5 |
| Example 8 | 204.3 | 165.2 | 148.6 | 136.0 | 91.5 | 62 | 7.1 |
| Comparative Example 6 | 215.4 | 193.5 | 164.3 | 113.5 | 69.1 | 100 | 9.4 |
| Comparative Example 7 | 222.4 | 181.5 | 160.0 | 73.3 | 45.8 | 69 | 8.5 |
| Comparative Example 8 | 121.3 | 100.1 | 66.4 | 58.2 | 87.7 | 53 | 6.1 |

Example 9

(Crystallization Process)

A certain amount of pure water was put into a reaction tank (60 L), and the intra-tank temperature was set to 42° C. while stirring it. In this process, a N$_2$ gas was passed through the reaction tank and was adjusted so as to give a dissolved oxygen concentration in the liquid in the reaction tank of 0.6 mg/L. A 2.0 M mixed aqueous solution of nickel sulfate, cobalt sulfate, and manganese sulfate, a 25% by mass sodium hydroxide solution as an alkaline solution, and a 25% by mass ammonia water as a complexing agent were added to this reaction tank simultaneously and continuously so as to give a molar ratio among nickel:cobalt:manganese of within this reaction tank 35:35:30. In this process, the flow was controlled so as to give a residence time of the mixed aqueous solution of 8 hours, the pH within the reaction tank was adjusted to be 11.8 to 12.1, and the ammonia concentration was adjusted to be 12 to 13 g/L. After the reaction tank stabilized, slurry containing a nickel-cobalt-manganese composite hydroxide was collected from an overflow port and was then filtered to obtain a cake of the nickel-cobalt-manganese composite hydroxide (the crystallization process). Then 1 L of pure water was passed through 140 g of the nickel-cobalt-manganese composite hydroxide within a Denver after filtration to wash away impurities. The powder after being washed was dried to obtain nickel-cobalt-manganese composite hydroxide particles represented by Ni$_{0.35}$Co$_{0.35}$Mn$_{0.30}$ (OH)$_2$+($0 \leq \alpha \leq 0.4$). The volume average particle diameter MV of the obtained composite hydroxide was 10.2 μm.

(Lithium-Niobium Mixing Process)

The obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 33.8:34.2:29.6:2.5 and an atomic ratio between a lithium amount (Li) and the total metal amount (Me) of nickel, cobalt, manganese, and niobium (hereinafter, referred to as Li/Me) of 1.07 and were then sufficiently mixed together using a shaker mixer (TURBULA Type T2C manufactured by Willy A. Bachofen (WAB)) to obtain a lithium mixture.

(Firing Process)

The obtained lithium mixture was fired by holding it in an air (oxygen: 21% by volume) flow at 940° C. for 10 hours and was then crushed to obtain a positive electrode active material containing a lithium-nickel-cobalt-manganese-niobium composite oxide. Table 5 and Table 6 list evaluation results.

Comparative Example 9

A positive electrode active material was obtained and evaluated similarly to Example 9 except that the obtained nickel-cobalt-manganese composite hydroxide particles and lithium carbonate were weighed so as to give a molar ratio among nickel:cobalt:manganese:niobium of 35.0:30.0:35.0:0.0 and Li/Me of 1.07. Table 5 and Table 6 list evaluation results.

Comparative Example 10

A positive electrode active material was obtained and evaluated similarly to Example 9 except that the obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 34.4:34.7:29.9:1.0 and Li/Me of 1.07. Table 5 and Table 6 list evaluation results.

Comparative Example 11

A positive electrode active material was obtained and evaluated similarly to Example 9 except that the obtained nickel-cobalt-manganese composite hydroxide particles, lithium carbonate, and niobic acid ($Nb_2O_5 \cdot nH_2O$) with an average particle diameter of 1.0 μm were weighed so as to give a molar ratio among nickel:cobalt:manganese:niobium of 31.7:32.1:27.7:8.5 and Li/Me of 1.07. Table 5 and Table 6 list evaluation results.

TABLE 5

| | Production condition | | | Positive electrode active material | | | | | | | | |
|---|---|---|---|---|---|---|---|---|---|---|---|---|
| | Nb addition amount at % | Method for adding Nb | Firing temperature ° C. | General Formula (1) | | | | Average particle diameter MV μm | 003 Crystallite diameter nm | Average degree of circularity | Nb solid-solving within primary particles | Nb concentration ratio (maximum/average) | Nb compound on surfaces of primary particles |
| | | | | Li d | Ni 1-a-b-c | Mn a | Co b | Nb c | | | | | | |
| Example 9 | 2.5 | Solid phase addition | 940 | 1.07 | 0.338 | 0.296 | 0.342 | 0.025 | 11.5 | 110.7 | 0.83 | Present | 1.7 | LiNbO3 |
| Comparative Example 9 | 0.0 | Solid phase addition | 940 | 1.07 | 0.350 | 0.300 | 0.350 | 0.000 | 11.9 | 136.3 | 0.7 | Absent | — | Absent |
| Comparative Example 10 | 1.0 | Solid phase addition | 940 | 1.07 | 0.344 | 0.299 | 0.347 | 0.010 | 11.9 | 125.4 | 0.82 | Present | 1.6 | LiNbO3 |
| Comparative Example 11 | 8.5 | Solid phase addition | 940 | 1.07 | 0.317 | 0.277 | 0.321 | 0.085 | 9.6 | 52.1 | 0.85 | Present | 3.5 | Li5NbO5, LiNbO3 |

TABLE 6

| | Initial characteristics (coin-type battery) | | Durability (laminate-type battery) | | | Thermal stability | |
|---|---|---|---|---|---|---|---|
| | | | Discharging | | | Maximum oxygen | |
| | Initial charging capacity mAh/g | Initial discharging capacity mAh/g | Initial discharging capacity mAh/g | capacity after 500 cycles mAh/g | Capacity maintenance rate % | generation peak intensity — | Oxygen generation amount wt % |
| Example 9 | 171.2 | 153.0 | 121.3 | 108.2 | 89.2 | 80 | 2.9 |
| Comparative Example 9 | 170.8 | 157.1 | 136.2 | 98.8 | 72.5 | 100 | 3.0 |
| Comparative Example 10 | 176.6 | 161.5 | 138.3 | 70.2 | 50.8 | 86 | 2.8 |

TABLE 6-continued

| | Initial characteristics (coin-type battery) | | Durability (laminate-type battery) Discharging | | | Thermal stability Maximum oxygen | |
|---|---|---|---|---|---|---|---|
| | Initial charging capacity mAh/g | Initial discharging capacity mAh/g | Initial discharging capacity mAh/g | capacity after 500 cycles mAh/g | Capacity maintenance rate % | generation peak intensity — | Oxygen generation amount wt % |
| Comparative Example 11 | 113.5 | 92.5 | 62.1 | 55.0 | 88.6 | 72 | 2.5 |

(Evaluation Results)

Figure 9A:
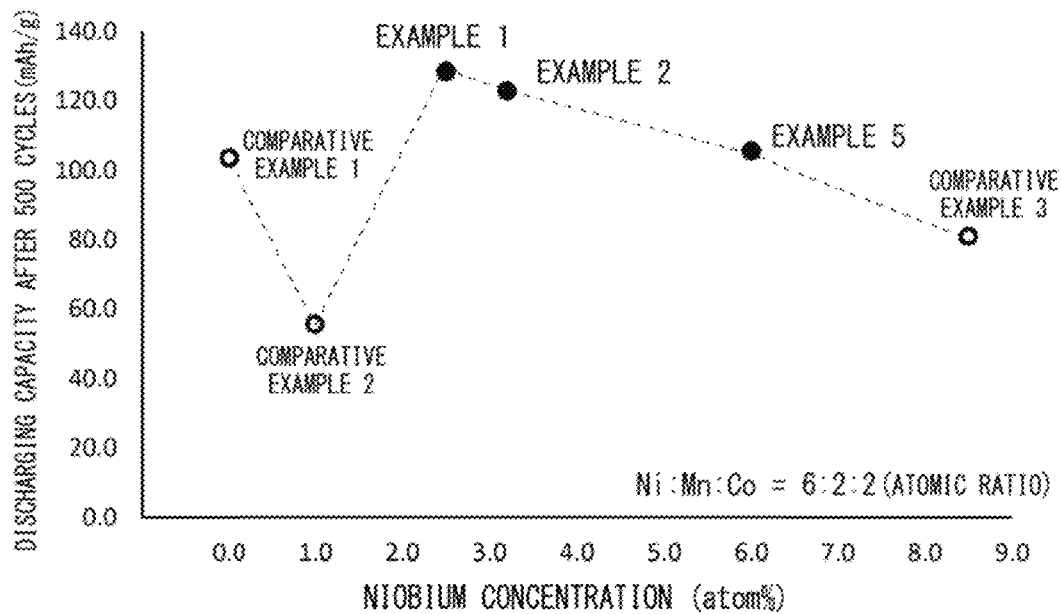
FIG. 9(A) and FIG. 9(B) are graphs of a relation between the niobium content of positive electrode active materials obtained in Examples 1 to 2 and 5 and Comparative Examples 1 to 3 and discharging capacity after 500 cycles (A) or an oxygen generation amount (B).
Figure 9B:
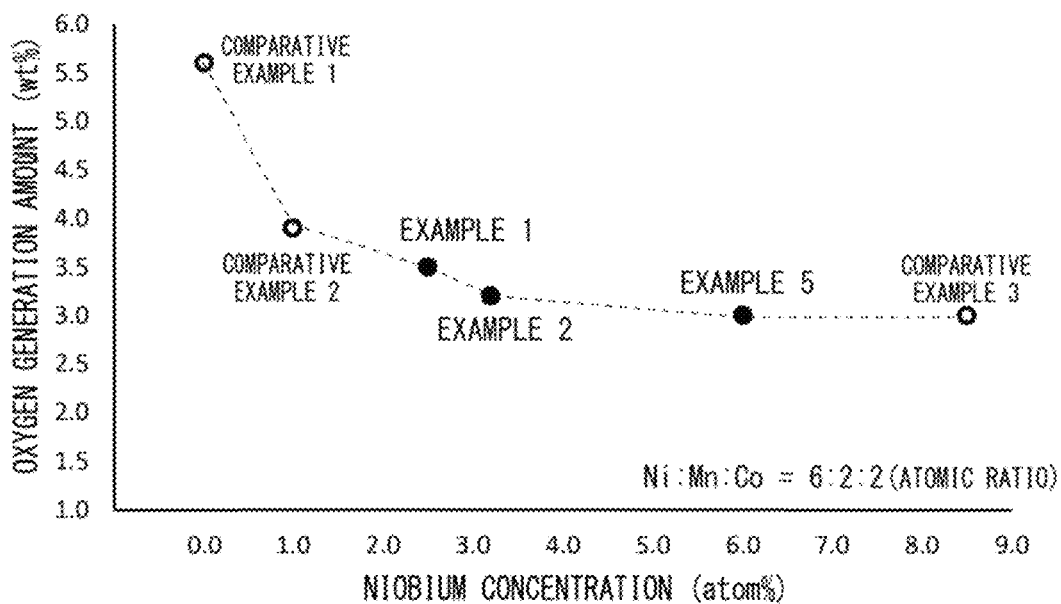
Figure 10A:
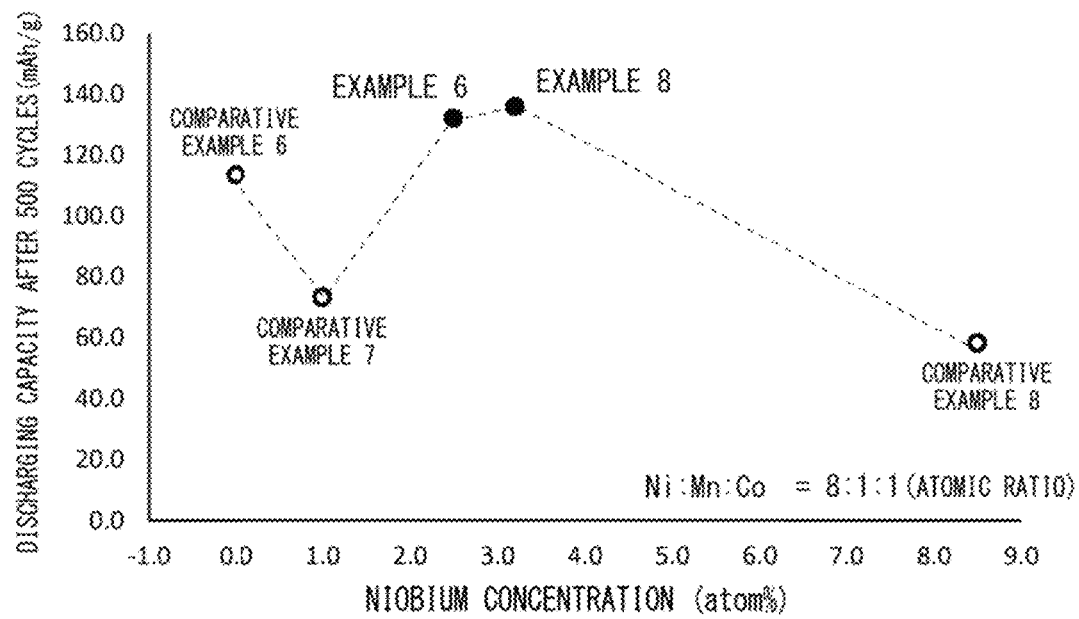
FIG. 10(A) and FIG. 10(B) are graphs of a relation between the niobium content of positive electrode active materials obtained in Examples 6 and 8 and Comparative Examples 6 to 8 and discharging capacity after 500 cycles (A) or an oxygen generation amount (B).
Figure 10B:
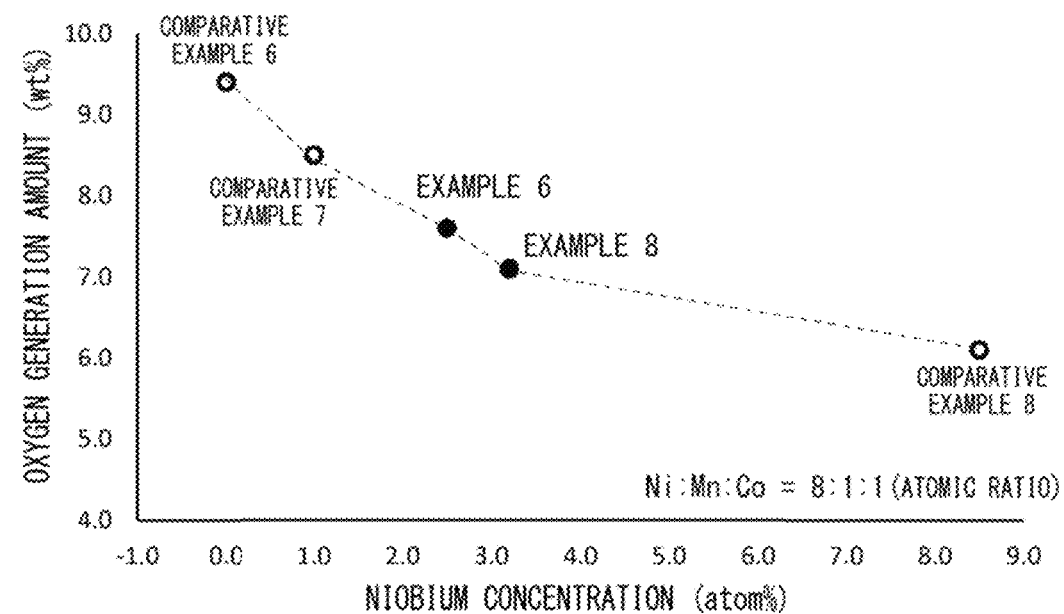
Figure 11A:
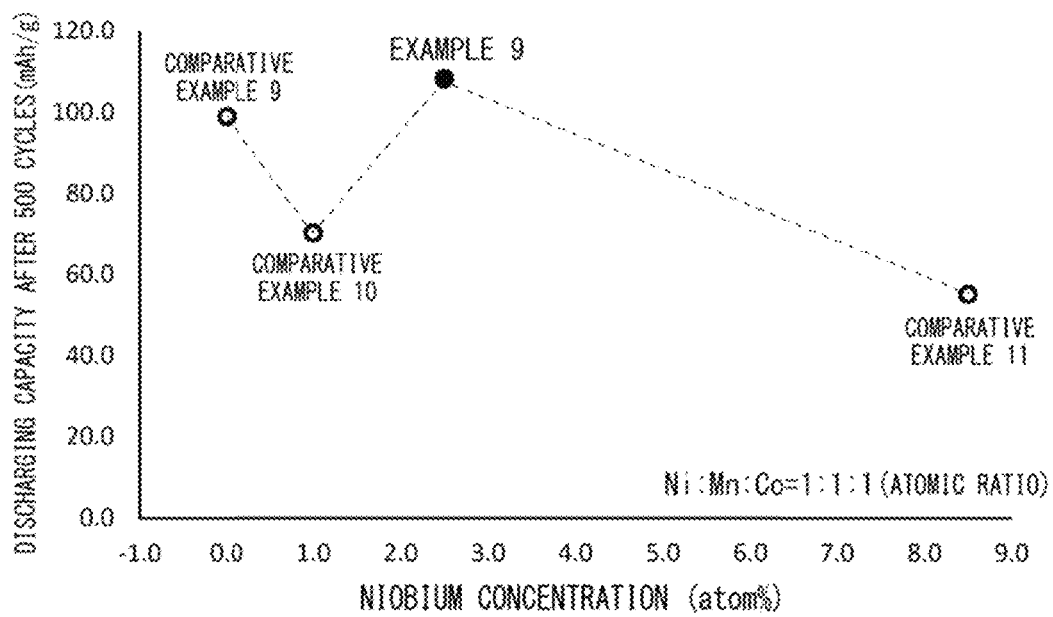
FIG. 11(A) and FIG. 11(B) are graphs of a relation between the niobium content of positive electrode active materials obtained in Example 9 and Comparative Examples 9 to 11 and discharging capacity after 500 cycles (A) or an oxygen generation amount (B).
Figure 11B:
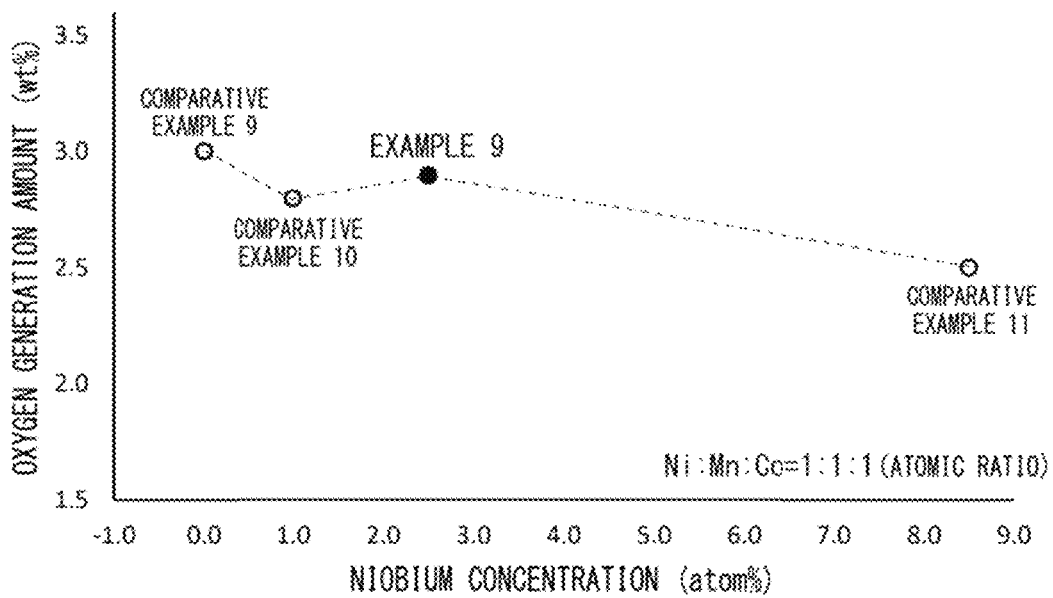

FIG. 9 to FIG. 11 are diagrams illustrating the influence of the content of niobium on the discharging capacity after 500 cycles and the oxygen generation amount for the positive electrode active material obtained in the examples and the comparative examples. FIG. 9, FIG. 10, and FIG. 11 illustrate evaluation results for the positive electrode active materials represented by an atomic ratio among Ni:Mn:Co (the element M) of 6:2:2, an atomic ratio among Ni:Mn:Co (the element M) of 8:1:1, and an atomic ratio among Ni:Mn:Co (the element M) of 1:1:1 (note that the atomic ratios are ratios calculated using values obtained by rounding off the numbers rounded off to the first decimal place in General Formula (1).), respectively, which were produced on the same condition except the Nb addition amount.

As listed in Table 1 to Table 6 an as illustrated in FIGS. 9 to 11, the positive electrode active materials obtained in the examples are extremely favorable in durability and are excellent in thermal stability compared with Comparative Examples 1, 6, and 9, which add no niobium. The content of Nb being at least 2 at % in particular markedly improves durability (the discharging capacity after 500 cycles and the capacity maintenance rate) compared with Comparative Examples 2, 7, and 10, which are less in the content of Nb than that content. The positive electrode active materials obtained in the examples have a (003)-plane crystallite diameter within the target range (50 to 130 nm), which is estimated to have influence on achieving both favorable electrochemical characteristics and thermal stability.

In all the positive electrode active materials obtained in the examples, Nb was solid-solved within the primary particles, and the presence of the lithium-niobium compound was determined. Consequently, it is estimated that Nb being solid-solved within the primary particles inhibits oxygen release and structural phase transition at the time of overcharging to contribute to thermal stability. Furthermore, it is estimated that the lithium-niobium compound present on the surfaces of the primary particles is chemically stable while having high lithium-ion conductivity, thus maintains electrochemical characteristics without deteriorating the active material, and consequently contributes to excellent durability.

On the other hand, the positive electrode active materials of Comparative Examples 1, 6, and 9 add no Nb and are thus larger in the crystallite diameter of the (003) plane, and in addition, the obtained secondary batteries are inferior to those that add Nb in both durability and thermal stability.

The positive electrode active materials of Comparative Examples 2, 7, and 10 are less in the Nb addition amount, and thus Nb is only solid-solved, and the lithium-niobium compound is not present. Although the positive electrode active materials of Comparative Examples 2, 7, and 10 are more excellent in thermal stability than those that add no Nb (refer to FIG. 9(B) to FIG. 11(B)), they are worse in durability (refer to FIG. 9(A) to FIG. 11(A)). Although the details of the cause of worsening durability is unclear in these positive electrode active materials, they are estimated to be caused by the elution of Nb from the bulk. Furthermore, the crystallite diameter of the (003) plane is larger than the target range, which may thus cause worsening of durability.

Comparative Examples 3, 8, and 11 are improved in both durability (the capacity maintenance rate) and thermal stability compared with those that add no Nb, but they are large in the Nb addition amount and thus increase positive electrode resistance and markedly reduce the initial discharging capacity. A reduction in the Ni amount contributing to redox also has an influence on the capacity reduction; it is estimated that thermal stability is apparently improved because of low electrochemical characteristics.

Comparative Example 4 is high in the firing temperature, thus causing sintering and flocculation to proceed and cation mixing, and is thus low in the initial capacity. Furthermore, it was low in durability owing to cation mixing and an increase in the crystallite diameter of the (003) plane. Comparative Example 5 is low in the firing temperature, thus crystal growth did not sufficiently proceed, Nb remained as a single body and was not solid-solved in the crystal structure almost at all, and there was a large concentration difference between the particle surface and the central part. Consequently, reaction resistance and bulk resistance were extremely high, worsening capacity and durability. It is estimated that thermal stability is apparently favorable similarly to Comparative Example 3 because the battery capacity is low.

The method for adding Nb may be either solid phase addition (e.g., Examples 1 and 2) or coating (e.g., Examples 3 and 4). In view of a higher effect of improving thermal stability, coating with niobium is preferably performed by the niobium coating process (Step S13); coating provides a slightly higher effect of improving thermal stability than solid phase addition. In view of productivity and the like, solid phase addition (the lithium-niobium mixing process (Step S12)) is preferred; industrially, solid phase addition is advantageous.

INDUSTRIAL APPLICABILITY

In the present embodiment, a positive electrode active material for a nonaqueous electrolyte secondary battery that achieves both high capacity and durability, and thermal stability can be obtained by an industrial method of production. This nonaqueous electrolyte secondary battery can be suitably used for power supplies of small-sized portable electronic devices (such as notebook personal computers and cellular phone terminals), which always require high capacity and long life.

The secondary battery of the present embodiment is excellent in thermal stability and is besides excellent in capacity and durability compared with conventional batteries containing a positive electrode active material of a lithium-cobalt-based oxide or a lithium-nickel-based oxide. Consequently, it can be reduced in size and increased in longevity and can thus be suitably used as power supplies for electric vehicles subjected to limitation in mounting space.

The positive electrode active material and the secondary battery containing the same of the present embodiment can be used as not only power supplies for electric vehicles purely driven by electrical energy but also power supplies for what is called hybrid cars, which use combustion engines such as gasoline engines and diesel engines in combination, and stationary storage batteries.

The technical scope of the present invention is not limited to the aspects described in the embodiment and the like. One or more of the requirements described in the embodiment and the like may be omitted. The requirements described in the embodiment and the like can be combined as appropriate. Japanese Patent Application No. 2016-252097 and all the literature cited in this specification are herein incorporated by reference in their entirety to the extent allowed by law.

DESCRIPTION OF REFERENCE SIGNS

10 Positive electrode active material
1 Primary particle
2 Secondary particle
3 Lithium-metal composite oxide
4 Lithium-niobium compound
CBA Coin-type battery
PE Positive electrode (electrode for evaluation)
NE Negative electrode
SE Separator
GA Gasket
WW Wave washer
PC Positive electrode can
NC Negative electrode can
LBA Laminate-type battery (laminate cell)
PS Positive electrode sheet
NS Negative electrode sheet
SE2 Separator
AS Aluminum laminate sheet
TL Tab lead

The invention claimed is:

1. A positive electrode active material for a nonaqueous electrolyte secondary battery, the positive electrode active material comprising a lithium-nickel-manganese composite oxide containing a secondary particle formed of a plurality of flocculated primary particles and a lithium-niobium compound, wherein
the positive electrode active material is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.12 \le a \le 0.60$, $0 \le b \le 0.60$, $0.025 \le c \le 0.04$, $a+b+c<1$, $0.95 \le d \le 1.20$, and $0 \le \gamma \le 0.5$),
the lithium-nickel-manganese composite oxide has a (003)-plane crystallite diameter of at least 50 nm and up to 130 nm,
the lithium-niobium compound is present on surfaces of the primary particles, and
part of niobium in the positive electrode active material is solid-solved in the primary particles.

2. The positive electrode active material for a nonaqueous electrolyte secondary battery according to claim 1, wherein the lithium-niobium compound contains at least one of $Li_3NbO_4$, $LiNbO_3$, $Li_5NbO_5$, $LiNb_3O_8$, and $Li_8Nb_2O_9$.

3. The positive electrode active material for a nonaqueous electrolyte secondary battery according to claim 1, wherein the lithium-niobium compound contains an amorphous phase.

4. The positive electrode active material for a nonaqueous electrolyte secondary battery according to claim 1, wherein the positive electrode active material has a volume average particle diameter MV of at least 5 μm and up to 20 μm.

5. The positive electrode active material for a nonaqueous electrolyte secondary battery according to claim 1, wherein the secondary particle has an average degree of circularity E of at least 0.60 and up to 0.98, the degree being determined by the following Expression (1):

$$E = 4\pi S/L^2 \qquad \text{Expression (1):}$$

(in the above expression, S is a projected area of the secondary particle, L is a circumferential length of the secondary particle, and π is the ratio of the circumference of a circle to its diameter).

6. The positive electrode active material for a nonaqueous electrolyte secondary battery according to claim 5, wherein the average degree of circularity E is at least 0.7 and up to 0.98.

7. The positive electrode active material for a nonaqueous electrolyte secondary battery according to claim 1, wherein $0.12 \le a \le 0.45$ in the General Formula (1).

8. A nonaqueous electrolyte secondary battery comprising:
a positive electrode;
a negative electrode; and
a nonaqueous electrolyte,
the positive electrode comprising the positive electrode active material for a nonaqueous electrolyte secondary battery according to claim 1.

9. A positive electrode active material for a nonaqueous electrolyte secondary battery, the positive electrode active material comprising a lithium-nickel-manganese composite oxide containing a secondary particle formed of a plurality of flocculated primary particles and a lithium-niobium compound, wherein
the positive electrode active material is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.12 \le a \le 0.45$, $0 \le b \le 0.60$, $0.02 \le c \le 0.08$, $a+b+c<1$, $0.95 \le d \le 1.20$, and $0 \le \gamma \le 0.5$),
the lithium-nickel-manganese composite oxide has a (003)-plane crystallite diameter of at least 50 nm and up to 130 nm,
the lithium-niobium compound is present on surfaces of the primary particles, and
part of niobium in the positive electrode active material is solid-solved in the primary particles.

10. A method for producing a positive electrode active material for a nonaqueous electrolyte secondary battery, the positive electrode active material comprising a lithium-nickel-manganese composite oxide containing a secondary particle formed of a plurality of flocculated primary particles and a lithium-niobium compound, the method comprising:
preparing a lithium-niobium mixture containing nickel-manganese composite hydroxide particles represented by General Formula (2): $Ni_{1-a-b}Mn_aM_b(OH)_{2+\alpha}$ (in Formula (2), M is at least one element selected from Co, W, Mo, V, Mg, Ca, Al, Ti, Cr, Zr, and Ta; and $0.12 \le a \le 0.60$, $0 \le b \le 0.60$, and $0 \le \alpha \le 0.4$), a niobium compound, and a lithium compound; and firing the lithium-niobium mixture in an oxidizing atmosphere at at least 750° C. and up to 1,000° C. to obtain the lithium-nickel-manganese composite oxide and the lithium-niobium compound, wherein the positive electrode active material is represented by General Formula (1): $Li_dNi_{1-a-b-c}Mn_aM_bNb_cO_{2+\gamma}$ (in General Formula (1), M is at least one element selected from Co, W, Mo, V, Mg, Ca, Al, Ti, Cr, Zr, and Ta; and $0.12 \le a \le 0.60$, $0 \le b \le 0.60$, $0.025 \le c \le 0.04$, and $0.95 \le d \le 1.20$, and, and $0 \le \gamma \le 0.5$), the lithium-niobium compound is present on surfaces of the primary particles, and part of niobium in the positive electrode active material is solid-solved in the primary particles.

11. The method for producing a positive electrode active material for a nonaqueous electrolyte secondary battery according to claim 6, wherein the preparing comprises:

obtaining the nickel-manganese composite hydroxide particles by crystallization; and mixing the nickel-manganese composite hydroxide particles, the lithium compound, and the niobium compound with an average particle diameter of at least 0.01 μm and up to 10 together to prepare the lithium-niobium mixture.

12. The method for producing a positive electrode active material for a nonaqueous electrolyte secondary battery according to claim 6, wherein the niobium compound is either one or both of niobic acid and niobium oxide.

13. The method for producing a positive electrode active material for a nonaqueous electrolyte secondary battery according to claim 6, wherein the preparing comprises:

obtaining the nickel-manganese composite hydroxide particles by crystallization;

adding a niobium salt solution and an acid to slurry obtained by mixing the nickel-manganese composite hydroxide particles and water together to obtain nickel-manganese composite hydroxide particles coated with a niobium compound; and mixing the nickel-manganese composite hydroxide particles coated with the niobium compound and the lithium compound together to prepare the lithium-niobium mixture.

14. The method for producing a positive electrode active material for a nonaqueous electrolyte secondary battery according to claim 6, the method comprising thermally treating the nickel-manganese composite hydroxide particles at a temperature of at least 105° C. and up to 700° C. before preparing the lithium-niobium mixture, wherein the preparing prepares a lithium-niobium mixture containing either one or both of nickel-manganese composite hydroxide particles and nickel-manganese composite oxide particles obtained by the thermally treating, a niobium compound, and a lithium compound.

15. The method for producing a positive electrode active material for a nonaqueous electrolyte secondary battery according to claim 6, wherein the lithium-niobium mixture is fired at at least 850° C.

16. A method for producing a positive electrode active material for a nonaqueous electrolyte secondary battery according to claim 15, the method comprising:

preparing a lithium-niobium mixture containing nickel-manganese composite hydroxide particles represented by General Formula (2): $Ni_{1-a-b}Mn_aM_b(OH)_{2+\alpha}$ (in Formula (2), M is at least one element selected from Co, W, Mo, V, Mg, Ca, Al, Ti, Cr, Zr, and Ta; and $0.12 \le a \le 0.45$, $0 \le b \le 0.60$, and $0 \le \alpha \le 0.4$), a niobium compound, and a lithium compound; and firing the lithium-niobium mixture in an oxidizing atmosphere at at least 750° C. and up to 1,000° C. to obtain the lithium-nickel-manganese composite oxide and the lithium-niobium compound.

* * * * *